(12) United States Patent
Watanabe et al.

(10) Patent No.: US 6,512,605 B1
(45) Date of Patent: Jan. 28, 2003

(54) IMAGE READING APPARATUS AND IMAGE READING METHOD

(75) Inventors: Tatsumi Watanabe, Kyoto-fu (JP); Yasuhiro Kuwahara, Osaka-fu (JP); Akio Kojima, Osaka-fu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/365,721

(22) Filed: Aug. 3, 1999

(30) Foreign Application Priority Data

Aug. 3, 1998 (JP) ............................................ 10-219004

(51) Int. Cl.[7] ................................................ H04N 1/46
(52) U.S. Cl. ...................... 358/514; 358/505; 358/524; 358/513
(58) Field of Search ................................ 358/514, 513, 358/512, 511, 505, 524, 518; 250/208.1

(56) References Cited

U.S. PATENT DOCUMENTS

| 4,806,750 | A | | 2/1989 | Vincent ...................... 250/226 |
| 5,315,412 | A | * | 5/1994 | Mihara et al. ............... 358/512 |
| 5,483,359 | A | * | 1/1996 | Yumiba et al. .............. 358/513 |
| 5,587,814 | A | * | 12/1996 | Mihara et al. ............... 358/512 |
| 5,917,621 | A | * | 6/1999 | Yushiya ....................... 358/518 |
| 6,046,829 | A | * | 4/2000 | Noda ........................... 358/513 |
| 6,144,469 | A | * | 11/2000 | Suganuma ................... 358/514 |

FOREIGN PATENT DOCUMENTS

JP 01-237619 9/1989

* cited by examiner

Primary Examiner—Cheukfan Lee
(74) Attorney, Agent, or Firm—McDermott, Will & Emery

(57) ABSTRACT

An inexpensive image reading apparatus which does not need a delay buffer and which permits image inputting with an image sensor array with reduced color dislocation on character edge etc. Color images are inputted in this process: Line reading circuit 102 reads three color data simultaneously. On the basis of the top and end points of a line of green data obtained by encoders and scanned position detection circuit, offset size deriving circuit 107 works out the top and end scanned positions for the data on the other colors, that is, red and blue. From the top to the end scanned positions for the respective colors, the mapping coordinates deriving circuit 108 works out the coordinates of the picture elements for the read color data. Mapping circuit 109 maps the respective color data on the image memory 110 at the positions corresponding to the coordinates obtained by the mapping coordinates deriving circuit 108.

22 Claims, 17 Drawing Sheets

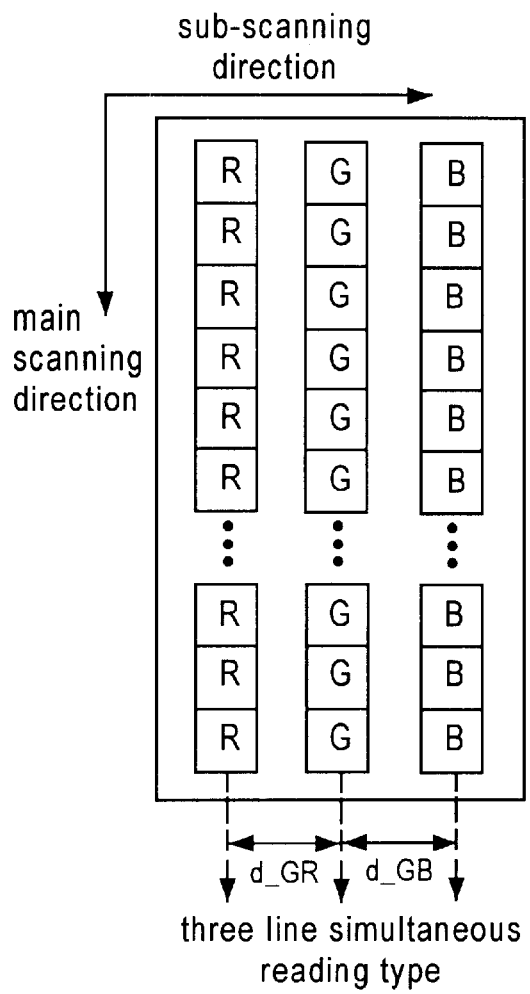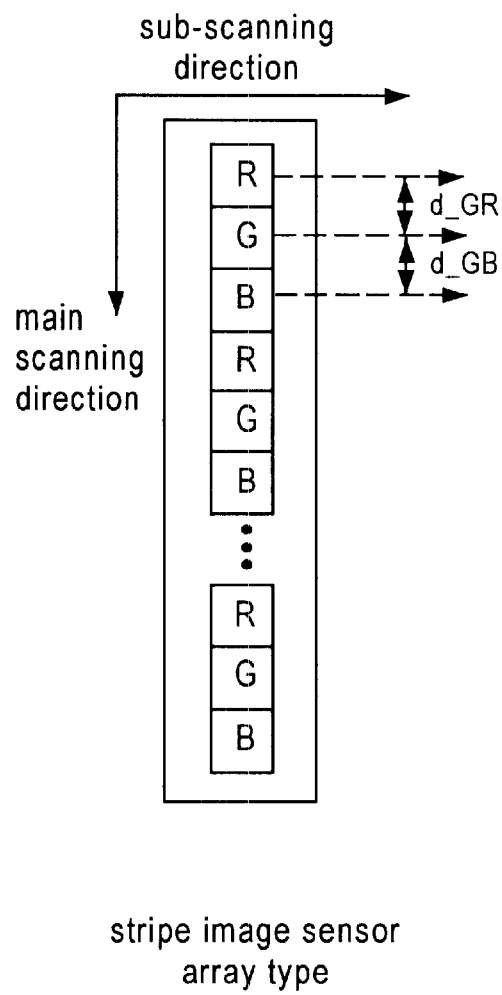
FIG. 2(a) three line simultaneous reading type
FIG. 2(b) stripe image sensor array type Sensor B reads data Sensor G reads data Sensor R reads data

FIG. 4(a)  Reads image
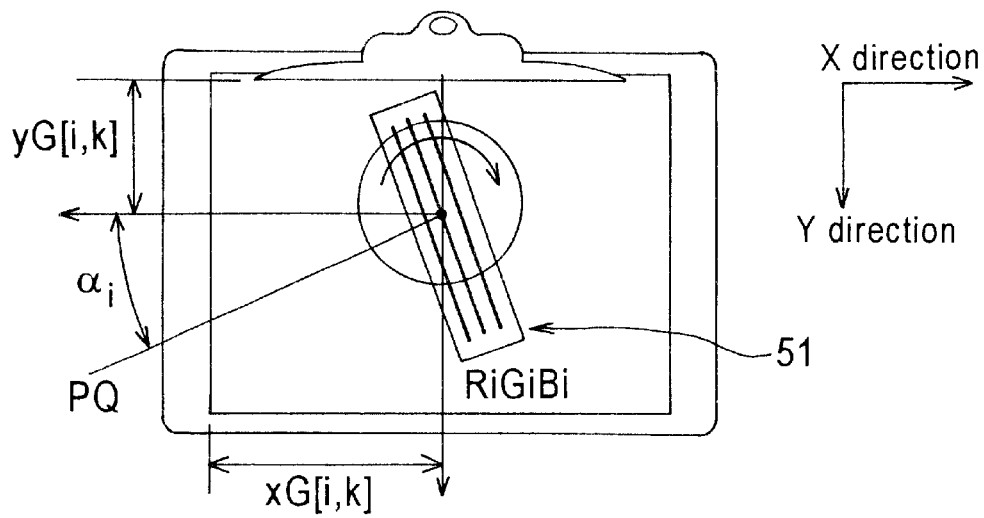
FIG. 4(b)  Determination of offset size from Line Gi to Lines Ri or Bi
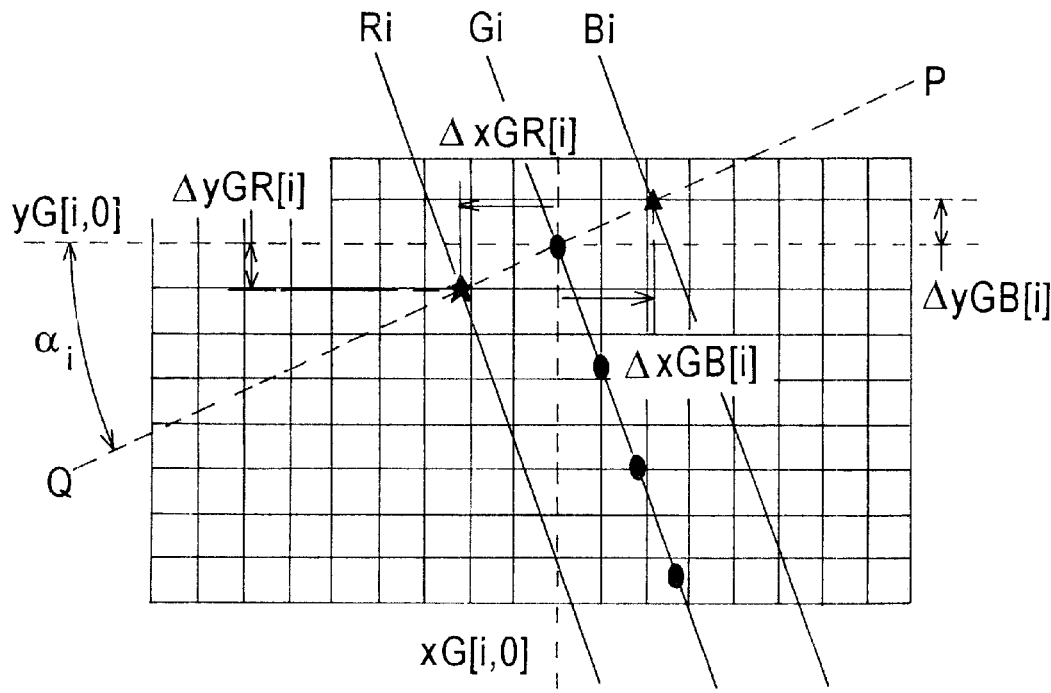
Determines the top scanned positions on Lines Ri, Bi on the basis of the top scanned position (xG[i,0], yG[i,0]) on the Line Gi.

IMAGE READING APPARATUS AND IMAGE READING METHOD

BACKGROUND OF THE INVENTION

1. Field of The Invention

The present invention relates to an image reading apparatus and image reading method. More specifically, this invention concerns an image reading apparatus, for example, an image scanner having a plurality of sensor lines disposed in parallel at a specific interval or one stripe-type sensor line and the image reading method.

2. Description of The Prior Art

A known type of image reading apparatus such as an image scanner has three sensor lines disposed at a specific interval for three kinds of colors—red, green and blue. The method of simultaneously reading the color data covered under the three sensor lines is called the three line simultaneous reading technique.

FIG. 2(a) is a conceptual presentation of the arrangements of the image sensor array of the three line simultaneous reading type. The sensor line to read red data is made up of a plurality of R sensor elements; the sensor line to read green data, of a plurality of G sensor elements; and the sensor line to read blue data, of a plurality of B elements.

It is understood that the main scanning direction corresponds to the direction in which the sensor elements of a kind are arranged to form a sensor line and the sub-scanning direction to the direction in which the image sensor array is moved for scanning.

Shown in FIG. 16 is a system diagram of the prior art apparatus for reading color images by scanning the document with such image sensor arrays.

To be more specific, three color data picked up by an image sensor array 100 are read by line reading means 102. The color data thus read are not uniform in output level among the sensor elements because of ununiformity in the amount of light from the light source, sensor element sensitivity and the like even when the document has an uniform shade, such as a sheet of black, white paper. This output data difference in output level among the sensor elements is corrected by shading correction means 105, and the color data read is accumulated in a color data delay buffer 1600. This color data delay buffer 1600 holds color data as they are inputted until after the other color data for one picture element are inputted. When all the three color data for one picture element or the same position on the document are ready, those data are mapped at a position on an image memory 110 by same picture element data mapping means 1601.

The line reading means 102 is made up of three amplifiers 103a, 103b, 103c that amplify the respective color data picked up by the image sensor array 100 and an analog to digital (A/D) converter circuit 104 for converting the analog values of those amplifiers to digital values.

The prior art image reading apparatus thus configured reads an image the following way:

First, the image sensor array 100 made up of red, green and blue sensor lines, each having sensor elements lined up, read color data simultaneously. The respective color data read are referred to shading correction means 105 through the amplifiers 103 and A/D converter circuit 104. The shading correction means 105 then subjects data of each color to shading correction. The color data thus obtained are mapped into the image memory 110 for display on CRT or the like.

Now, the mapping of color data into the image memory space will be explained.

Let it be supposed that the color data of a document at a point given by coordinates (X, Y) are to be read using an image sensor array in which red, green and blue sensor lines are disposed from the starting point in the sub-scanning direction in that order as shown in FIG. 2(a).

First, a specific B sensor element, a constituent in the sensor line for blue, reads a blue data C-B as shown in FIG. 3(a). This blue data C-B is then stored at the read color data delay buffer 1600 as shown in FIG. 16.

In the next step, as a specific G sensor element, a constituent in the sensor line for green, gets to the position given by the same coordinates (X, Y) on the document, the sensor element reads the green data C-G. This C-G is also stored at the read color data delay buffer 1600.

When a specific R sensor element, a constituent in the sensor line for red, reaches the same position given by coordinates (X, Y) on the document, the red data C-R is read in and then mapped by the same picture element mapping means 1601 into the image memory 110 at the identical coordinates along with the blue data C-B and the green data C-G that have been stored by the color data delay buffer 1600.

As set forth above, the respective color data from a specific position on the document are held in the color data delay buffer 1600 until all three color data for that position are read. Then the three color data are simultaneously brought into the same position in the image data memory space.

There are also other types of apparatuses for inputting images by the image scanner. They include:

(1) Light source switching type which uses a light source having the spectral characteristics of the primary colors for color images and one image sensor array for black and white. The light source is switched on for three primary colors one after another to separate the image data on the color document into three primary color data.

(2) Stripe image sensor array type in which a three-color stripe filter is pasted over the light intake face of the sensor unit. In this type, a set of separated color data is simultaneously read from the start in the main scanning direction using an image sensor array in which sensor elements to detect red, green and blue are disposed in a stripe. The image reading apparatus using an image sensor array of the stripe type is configured as in FIG. 17. The principle is disclosed in Japanese patent application laid open unexamined under No. 1-237619.

The image sensor array 1400 of the stripe type is constituted as shown in FIG. 2(b). Following this image sensor array 1400, second line reading means 1401 reads red, green and blue data almost simultaneously. And the green scanned position detection means 1700 detects all the scanned positions of the green data on the line.

Then, a red element and a blue element placed on the two sides of each green element read red and blue data respectively. And those red and blue data as well as the green data as a set are mapped on the image memory 110 at the coordinates for the picture element for the green data as if the red and blue data both shared the same picture element position with the green data.

With the image sensor array of the stripe type as in (2), a set of neighboring red, green and blue color data, which are actually read at different positions in the main scanning direction are mapped into the image memory as color data at one and the same position, to input an image.

It has been pointed out that the image reading apparatus of the three-line simultaneous reading type has the following problems:

The time required to obtain three color data at the same position on the document increases with these distances—the distance between the G sensor line and the R sensor line which shall be given as d-GR picture elements distance and the distance between the G sensor line and the B sensor line as d-GB picture elements distance. To keep with an increase in distance, the read color data delay buffer 1600 would have to be increased in size. Even if the distances between the sensor lines are fixed, the buffer 1600 would have to be larger in size for a larger resolution of the image sensor array.

Another point is that to make it easy for the user to input an image, it is desirable that the scanning direction is not restricted. For the scanning image sensor array is not always moved in one direction but possible to be changed. It is possible that the unit is moved back. In the mapping method as in FIG. 3, the color data to be held in the read color data delay buffer 1600 has to be changed and adapted to the scanning direction in such a case, which makes the image inputting circuit very complicated.

With the stripe reading type as disclosed in unexamined Japanese patent application No. 1-237619, a set of red, green and blue data read in as shown in FIG. 2(*b*) are originally not at the same picture element position. In the prior art image reading apparatus of the stripe reading type, a plurality of color data originally not at the same position are mapped as those belonging to one and the same position, resulting in color dislocation.

SUMMARY OF THE INVENTION

Addressing those problems with the prior art, the present invention is built on such prior art image reading apparatuses—the apparatuses for simultaneously reading color data of a plurality of colors by scanning over the color document with line reading means having a plurality of sensor lines disposed at a specific interval to read color data of a plurality of kinds of colors, usually three colors—red, green and blue.

As shown in FIGS. 1, 5 and 13, scanned position detection means 106 detects the scanned positions for the respective color data read as described. On the basis of the scanned positions detected by the scanned position detection means 106, coordinates deriving means 10 derives the coordinates to be occupied on the image memory by color data for a plurality of colors read by the line reading means—coordinates for a picture element for different color data.

Finally, mapping means 109 maps the respective read color data at the coordinates on the image memory obtained by the coordinate deriving means 10.

The coordinates deriving means 10 may be formed of mapping coordinates deriving means 108 and offset size deriving means 107 as shown in FIG. 1.

The scanned position detection means 106 detects the scanned positions for the read color data of a specific kind of color. The scanned positions for the specific color data that can be selected are the top scanned position of the specific color data and the end scanned position. But the kind of color is not restrictive. Color data of some other color at the top and end scanned positions may be used.

On the basis of the specific scanned positions detected by the scanned position detection means 106, the offset size deriving means 107 works out an offset size. The offset size is from the specific scanned position to the corresponding scanned position for the other respective color data that has not been detected. Then, the mapping coordinates deriving means 108 picks up the offset size detected by the offset size deriving means 107. From the offset size, the means 108 derives the scanned positions for all color data read by the aforesaid sensor lines and works out the coordinates to be occupied on the image memory by all the color data.

The coordinates deriving means 10 may also comprise base color coordinates deriving means 500 and missing color coordinates deriving means 501 as shown in FIG. 5.

On the basis of the aforesaid specific scanned position of the sensor lines where the scanned position detection means 106 detected the above color data for the specific color, the base color coordinates deriving means 500 works out coordinates of the picture elements for the aforesaid specific color. That is, the coordinates are to be occupied on the image memory by all the scanned positions of the respective color data on the specific color. From the picture element coordinates for the color data on the specific color found by the base color coordinates deriving means 500, the missing color coordinates deriving means 501 works out the coordinates on the image memory for all color data on the other colors than the aforesaid specific color.

In the examples set forth above, the scanned position for color data for a specific color is detected and the subsequent procedure is performed on the basis of that result. Instead, it is possible to directly process all color data on the respective colors. This method is so configured as shown in FIG. 13. That is, the scanned position detection means 106 detects all the scanned positions for the respective color data and the coordinates deriving means 10 separately derives the coordinates for each color that are to be occupied on the image memory. All the coordinates for the color data read that the line reading means has read are found that way.

The arrangements described above are provided with a plurality of sensor lines, one line for one specific color. The present invention is also applicable to an image reading apparatus of the so-called stripe sensor type in which the sensor elements for the respective colors are lined up on a stripe, that is, one sensor line.

To illustrate, as shown in FIG. 14, the aforesaid color data for a plurality of colors are simultaneously read by scanning the document with second line reading means of the stripe sensor line construction. And the specific color scanned position detection means 1402 detects all the scanned positions for color data for a specific color out of the color data read. On the basis of all the scanned positions thus obtained, the coordinates deriving means 10 derives the coordinates to be occupied on the image memory by all color data that the line reading means has read—the different coordinates for different picture elements corresponding to the color data. And the respective color data read are mapped at the coordinates.

The coordinates deriving means 10 in the aforesaid arrangements may be provided additionally with a sensor-direction offset size deriving means 1403 and second mapping coordinates deriving means 1404.

The sensor-direction offset size deriving means 1403 works out the offset size between the sensor elements to find the scanned position for the other color data that has not been detected. That is done on the basis of the scanned position detected by the specific color scanned position detection means 1402. The second mapping coordinates deriving means 104 works out the picture element coordinates to be occupied on the image memory for all the color data on the basis of the offset size in the sensor direction obtained by the sensor-direction offset size deriving means.

The color data for the coordinates thus obtained can fail to produce image data with a sufficiently high density, making it necessary to interpolate the color data at the coordinates between the mapping coordinates. Needless to say, the interpolation may be effected by either or both of the following methods. One is to work out the color data between the neighboring scanned positions (mapping positions) on the same sensor line. The other involves calculating the color data between the opposed scanned positions (mapping positions) between the neighboring sensor lines for the same color.

BRIEF DESCRIPTION OF THE DRAWINGS

FIG. 2(a) is a schematic diagram showing a image sensor array of the simultaneously reading three-line type.

FIG. 2(b) is a schematic diagram showing an image sensor array of the stripe reading type.

FIG. 4(a) is a schematic diagram showing the reading of an image on the image reading apparatus of the first embodiment of the present invention.

FIG. 4(b) is a schematic diagram showing the offset size on the offset size deriving means of the image reading apparatus of the first embodiment of the present invention.

DESCRIPTION OF THE PREFERRED EMBODIMENTS

Figure 1:
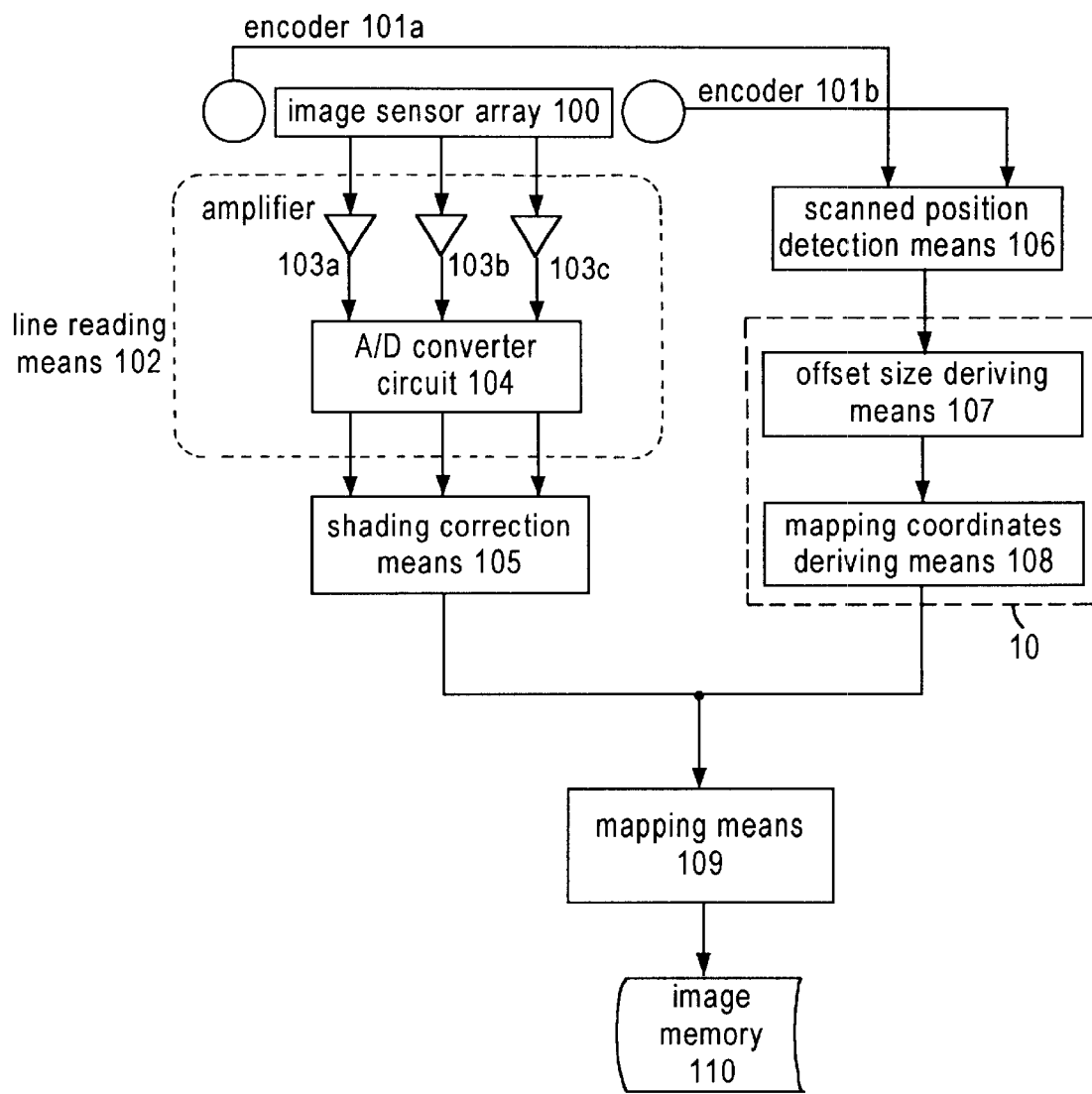
FIG. 1 is a block diagram showing the arrangements of an image reading apparatus in a first embodiment of the present invention.
Figure 3A:
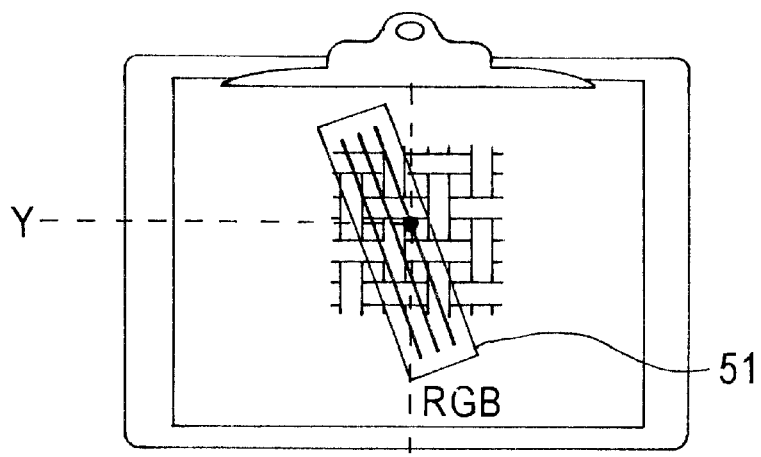
FIG. 3 is a schematic diagram illustrating the operation of the prior art image reading apparatus of the simultaneous reading three-line type.
Figure 3B:
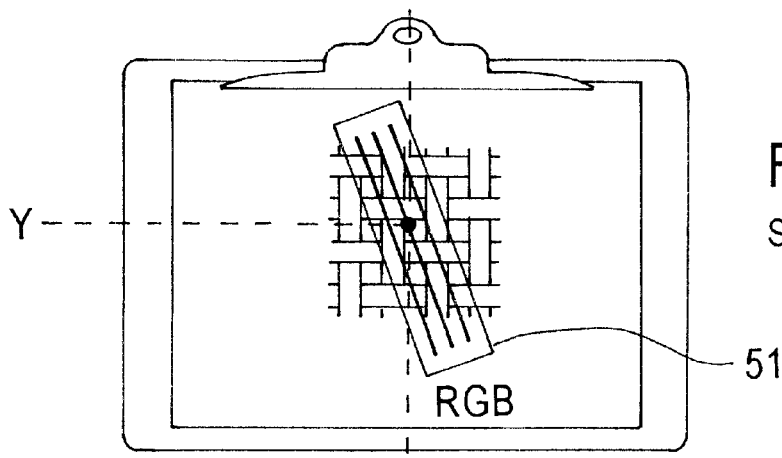
Figure 3C:
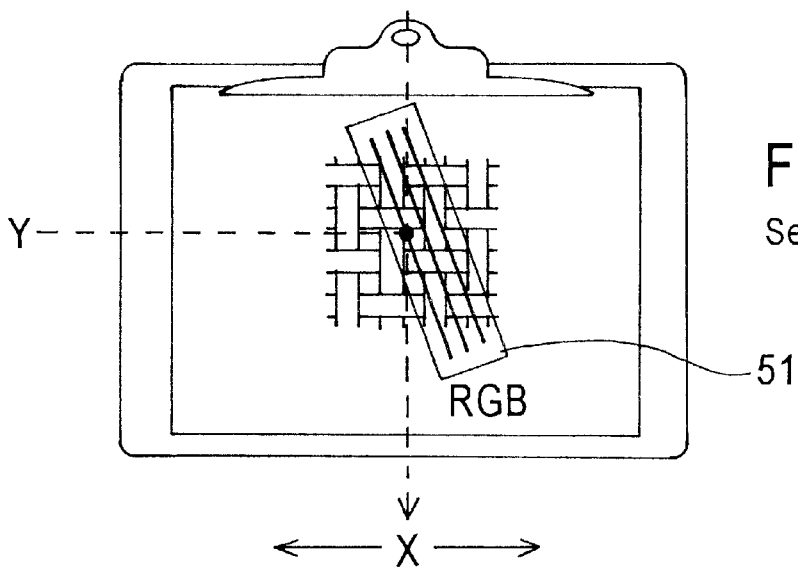
Figure 5:
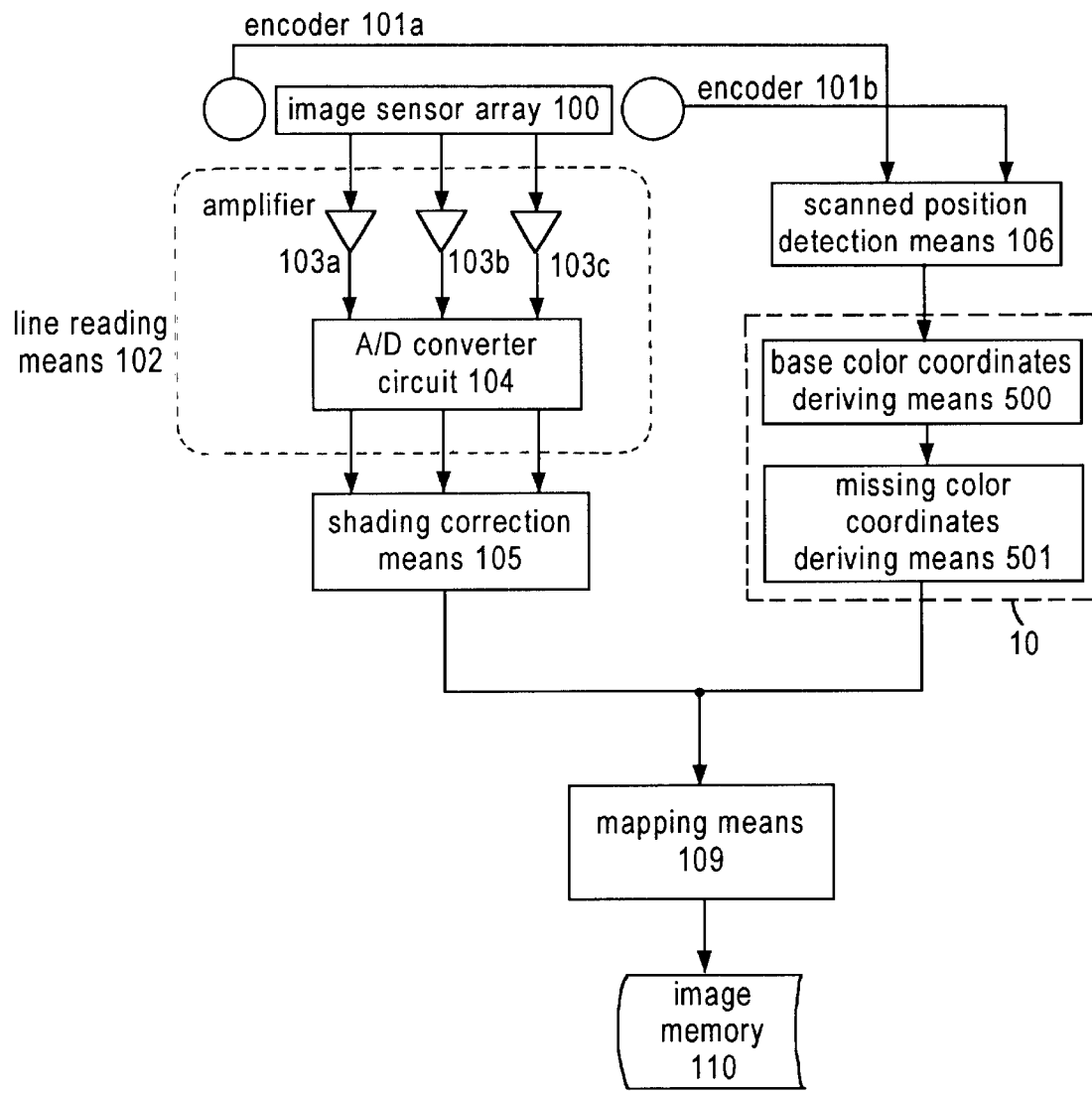
FIG. 5 is a block diagram showing the arrangements of an image reading apparatus in a second embodiment of the present invention.
Figure 7:
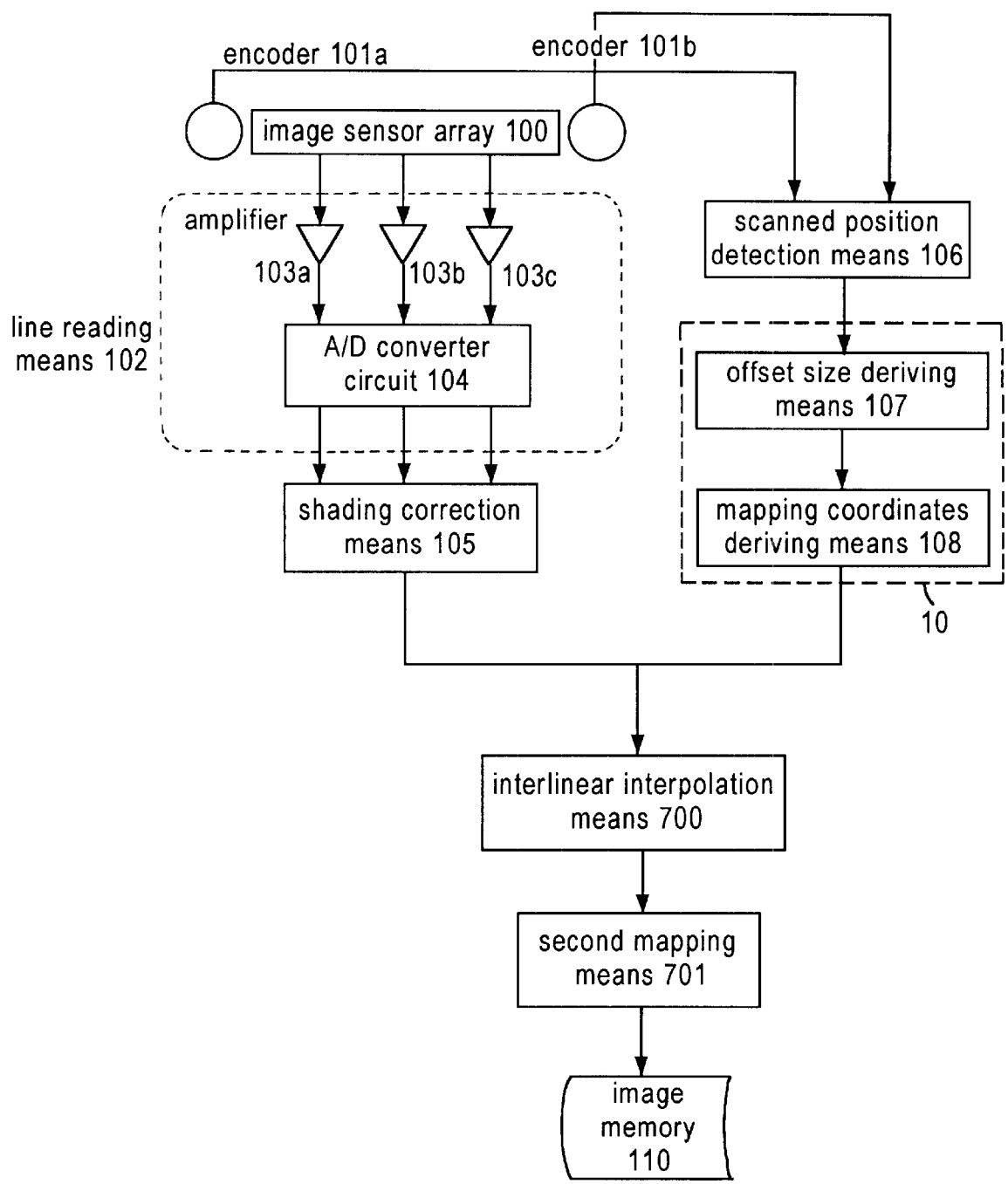
FIG. 7 is a block diagram showing the arrangements of an image reading apparatus in a third embodiment of the present invention.
Figure 9:
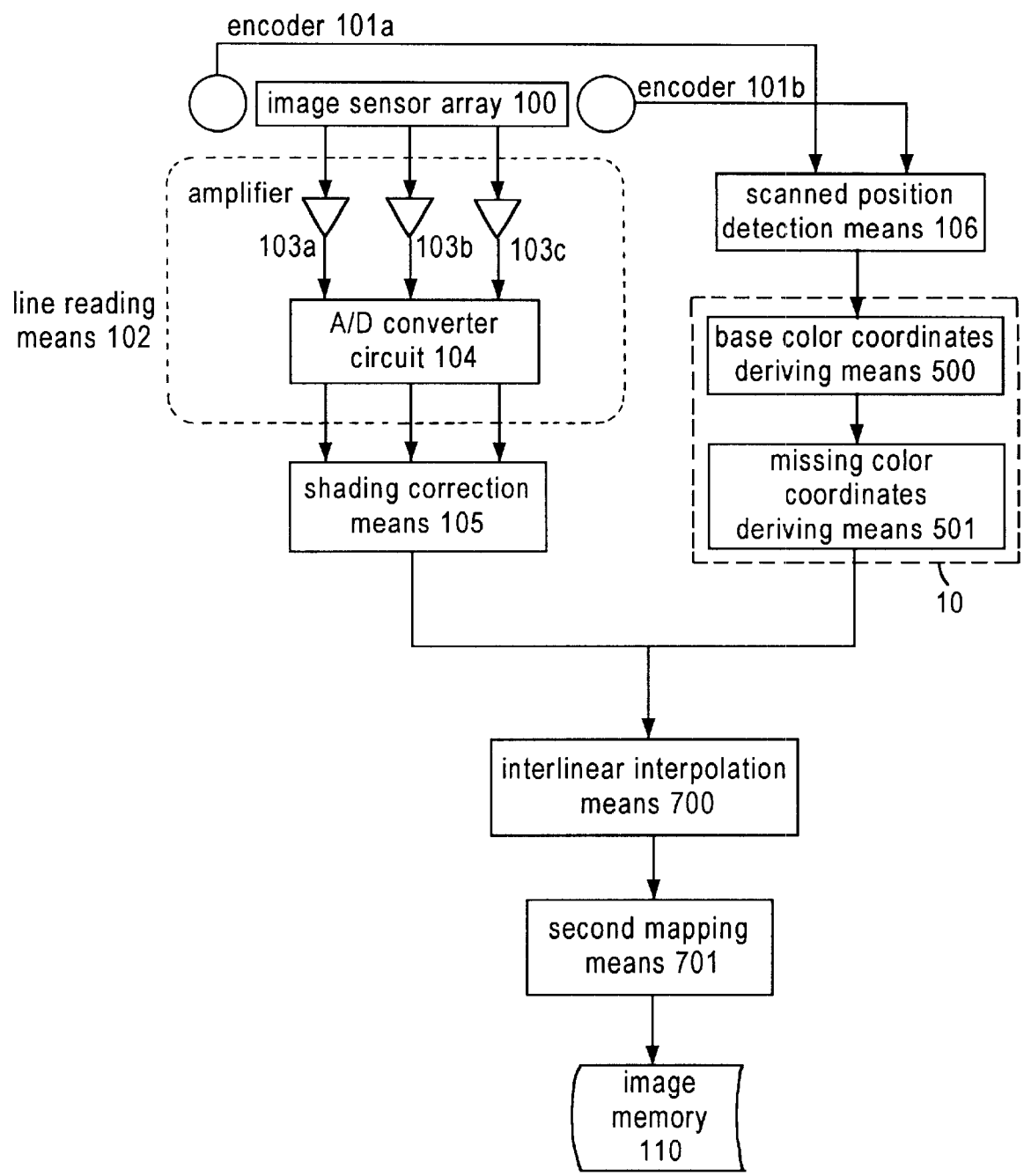
FIG. 9 is a block diagram showing the arrangements of an image reading apparatus in a fourth embodiment of the present invention.
Figure 10:
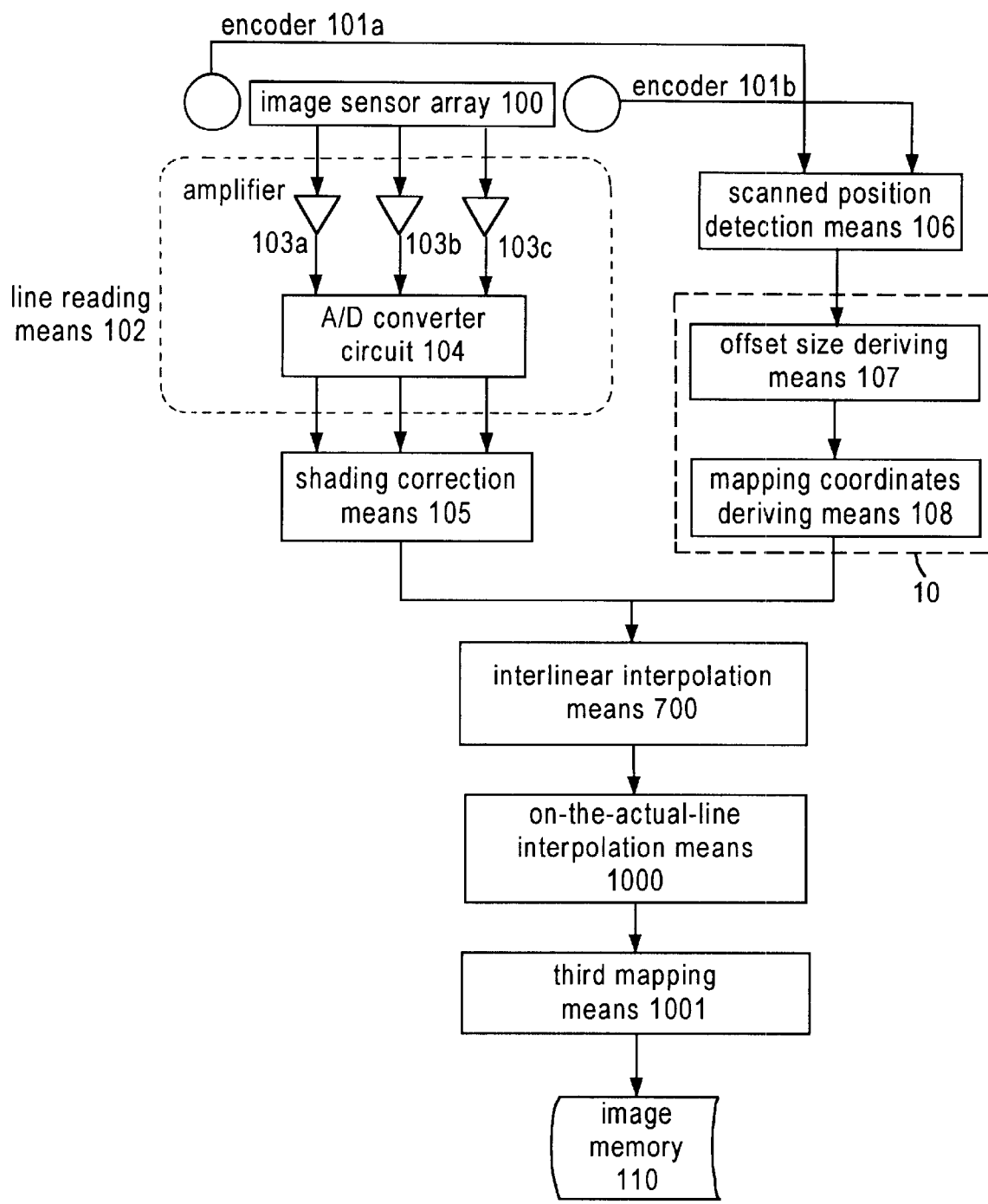
FIG. 10 is a block diagram showing the arrangements of an image reading apparatus in a fifth embodiment of the present invention.
Figure 12:
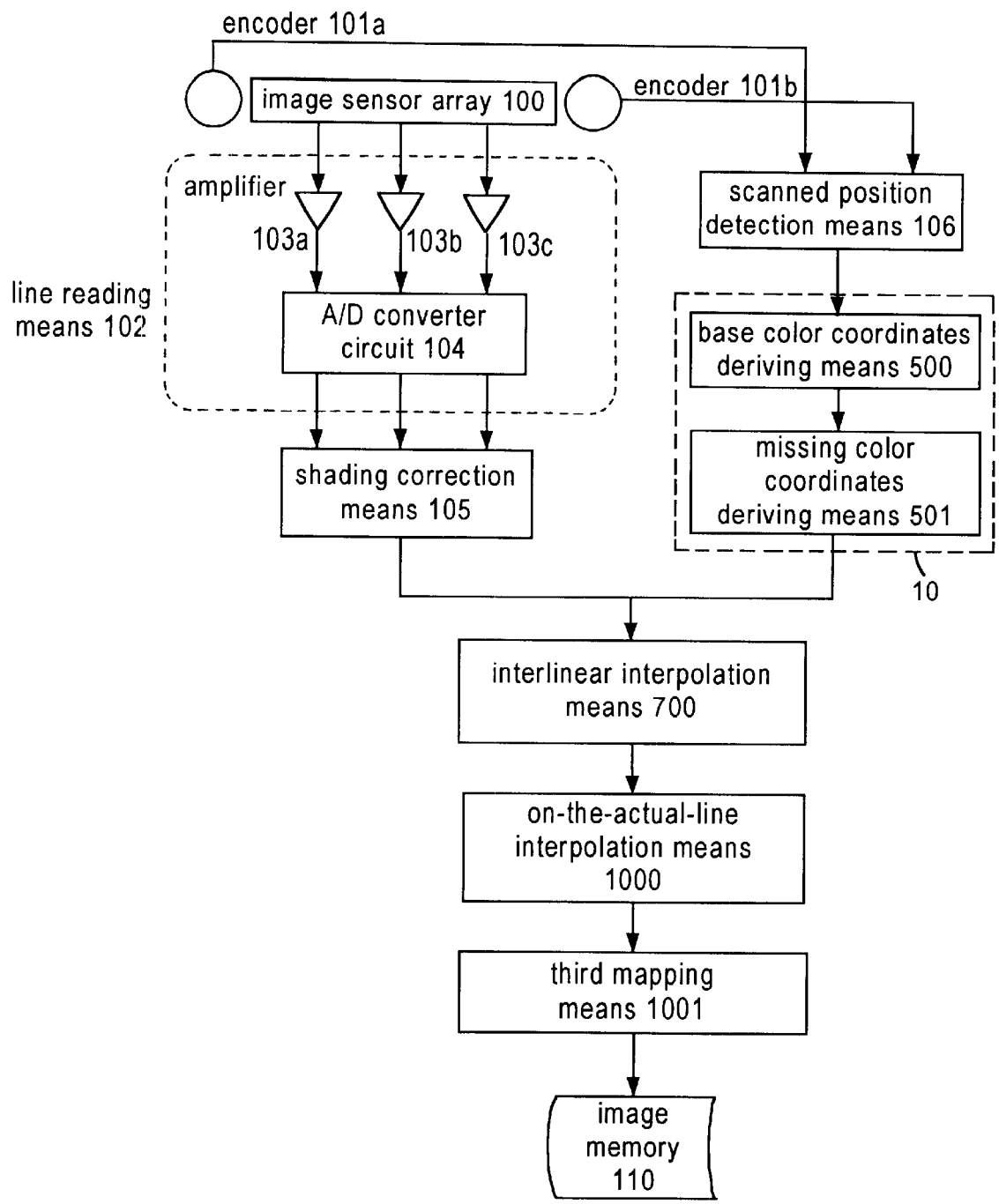
FIG. 12 is a block diagram showing the arrangements of an image reading apparatus in a sixth embodiment of the present invention.
Figure 13:
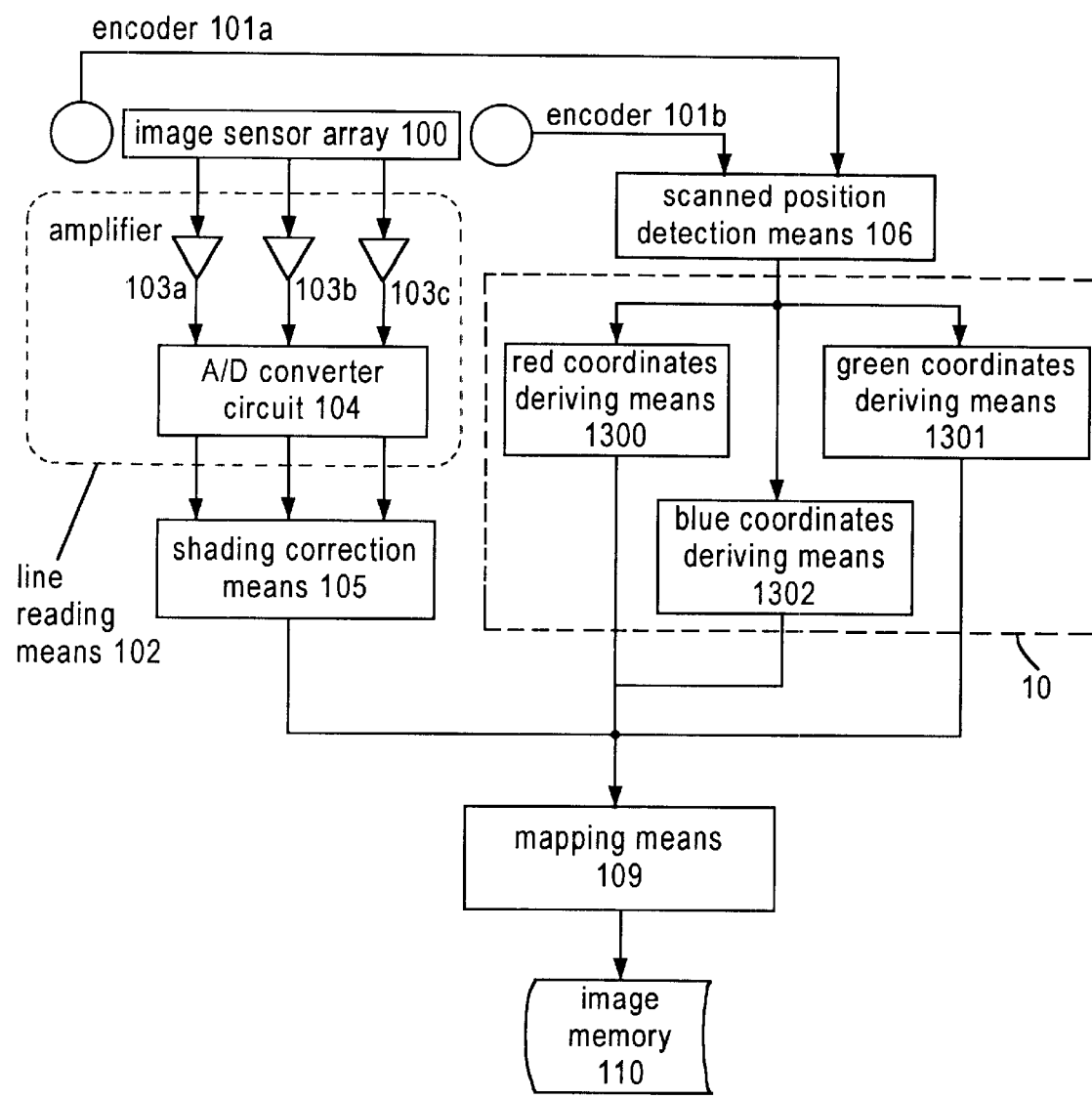
FIG. 13 is a block diagram showing the arrangements of an image reading apparatus in a seventh embodiment of the present invention.
Figure 14:
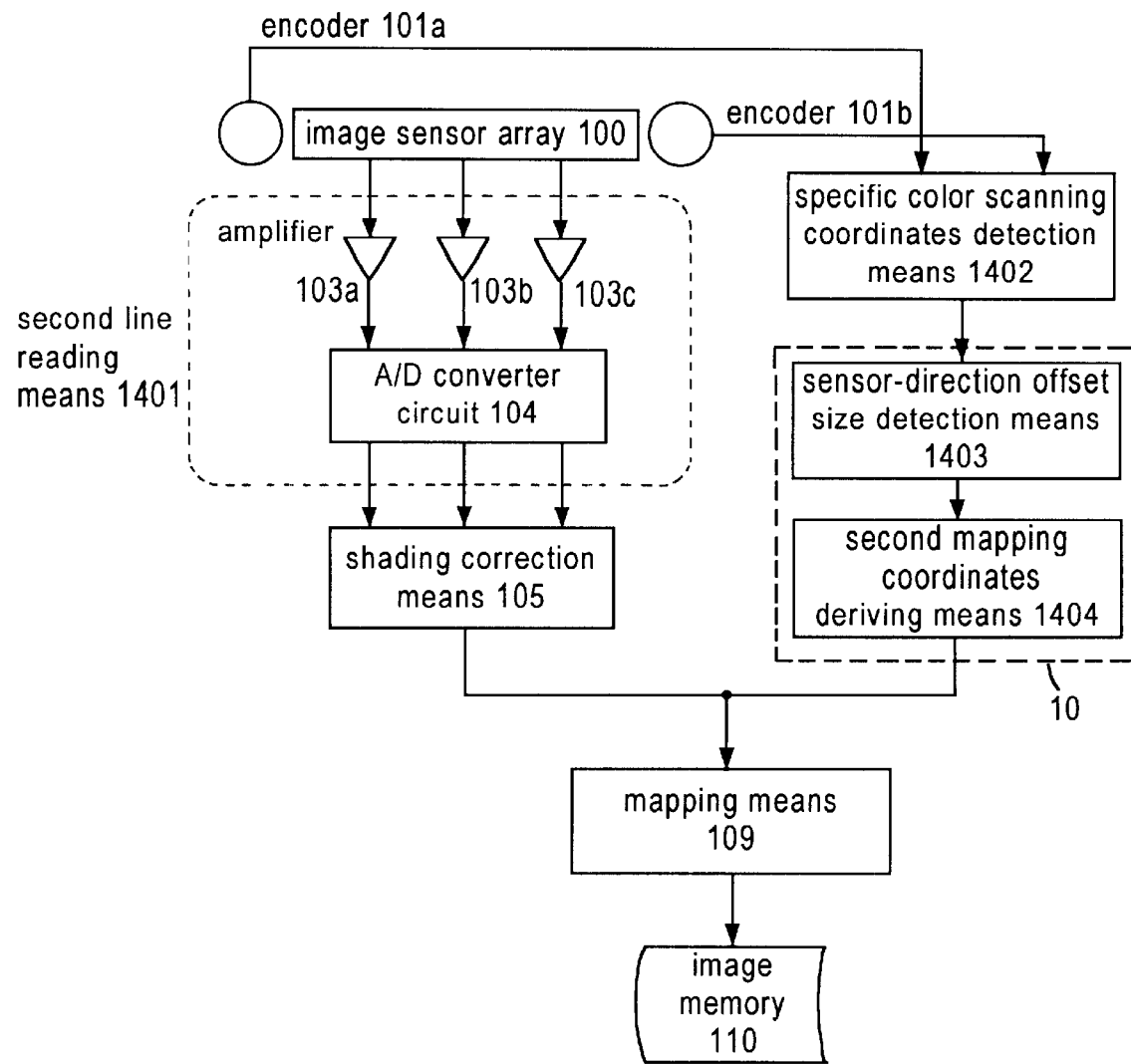
FIG. 14 is a block diagram showing the arrangements of an image reading apparatus in an eighth embodiment of the present invention.

FIG. 1 shows the configuration of an image reading apparatus as a first embodiment of the present invention. FIG. 5 shows the configuration of an image reading apparatus as a second embodiment of the present invention. FIG. 7 shows the configuration of an image reading apparatus as a third embodiment of the present invention. FIG. 9 shows the configuration of an image reading apparatus as a fourth embodiment of the present invention. FIG. 10 shows the configuration of an image reading apparatus as a fifth embodiment of the present invention. FIG. 12 shows the configuration of an image reading apparatus as a sixth embodiment of the present invention. FIG. 13 shows the configuration of an image reading apparatus as a seventh embodiment of the present invention. FIG. 14 shows the configuration of an image reading apparatus as an eighth embodiment of the present invention.

Throughout those configuration diagrams, the like or corresponding parts are denoted by like reference numerals. It is also understood that coordinates and transfer size are all indicated in picture element unit.

Embodiment 1

Now, there will be described an image reading apparatus and image reading method as first embodiment of the present invention.

Referring to FIG. 1, the image sensor array 100 includes three sensor lines of a length disposed in parallel with each other at a specific interval for reading red, green and blue data, each of the sensor lines having a plurality of R, G or B sensor elements lined up.

Encoders 101a and 101b are formed integrally with the image sensor array 100 and send out pulses from which the distance moved of the image sensor array 100 is found.

The line reading means 102 reads red, green and blue color data by way of the image sensor array 100. And the shading correction means 105 makes up sensor element sensitivity and the like.

The scanned position detection means 106 receives pulses from encoders 101a and 101b and determines the top scanned position and end scanned position on the green sensor line.

The offset size deriving means 107 derives the offset size of each of the other sensor lines read—the offset size to detect the top scanned position and end scanned position on each of the red and blue sensor lines—from the top scanned position and end scanned position on the green sensor line found by the scanned position detection means 106.

The mapping coordinates deriving means 108 works out the coordinates on the image memory for red, green and blue data—the data read by the line reading means 102—on the basis of the top scanned position and end scanned positions on the R, G and B sensor lines obtained by the scanned position detection means 106 and the offset size deriving means 107.

The mapping means 109 maps each color data—the data read by the line reading means 102—at the mapping coordinates set on the image memory 110 which have been worked out by the mapping coordinates deriving means 108.

The line reading means 102 is made up of amplifiers 103a, 103b, 103c to amplify the red, green and blue color data read by the image sensor array 100, and an A/D converter circuit 104 to convert the three amplified color data into digital signals.

There will now be explained in detail the operation of the image reading apparatus thus built as a first embodiment.

The image sensor array 100 first simultaneously reads red, green and blue color data on the sensor lines. The color data read are referred to the shading correction means 105 through the amplifiers 103 and A/D converter circuit 104. The shading correction means 105 subjects color data to shading correction one by one. The values thus obtained or corrected color data are to be mapped at the respective coordinates on the image memory 110 for display on CRT and others. The respective coordinates are worked out this way:

The pulses obtained at the encoders 101a and 101b are converted into scanned positions by the scanned position detection means 106. Thus detected are the top scanned position on the G sensor line—the zeroth reading position, that is, the top sensor element position (picture element position)—and the end scanned position on the G sensor line—the (Len−1)-th reading position. Len represents the number of sensor elements (number of picture elements) used for reading data on the sensor line.

Next, the offset size deriving means 107 works out the offset size from the top scanned position on the G sensor line to the top scanned positions on the R and B sensor lines. This process is schematically shown in FIG. 4. FIG. 4(a) shows the G sensor line reading image data, located at a position given by the coordinates [xG(i, k), yG(i, k)], on its line.

It is noted that the angle formed by the x direction—horizontal direction—with the perpendicular PQ to the sensor line—is given as αi and that Gi indicates the i-th G sensor line counted from the reading starting-point in the sub-scanning direction. It is also noted that k indicates the k-th sensor element (picture element number) on the G sensor line.

Here, the offset sizes [ΔxGR(i), ΔyGR(i)] and [ΔxGB(i), ΔyGB(i)] from the top scanned position [xG(i, 0), yG(i, 0)] on the Gi line to the top scanned positions on the Ri line and the Bi line are given as in formula 1 where the distance between the G sensor line and the R sensor line is d-GR picture elements long and the distance between the G sensor line and the R sensor line is d-GB picture elements long.

$\Delta xGR[i]=-d\_GR\times\cos\alpha i$ $\Delta xGB[i]=d\_GB\times\cos\alpha i$ $\Delta yGR[i]=d\_GR\times\sin\alpha i$ $\Delta yGB[i]=-d\_GB\times\sin\alpha i$ (Formula 1)

Then, the top scanned position [xR(i, 0), yR(i, 0)] on the Ri line and the top scanned position [xB(i, 0), yB(i, 0)] on the Bi line can be obtained from the top scanned position [xG(i, 0), yG(i, 0)] on the Gi line. Similarly, the end scanned position [xR(i, Len−1), yR(i, Len−1)] on the Ri line and the end scanned position [xB(i, Len−1), yB(i, Len−1)] on the Bi line can be found from the end scanned position [xG(i, Len−1), yG(i, Len−1)] on the Gi line. The results are as given in formula 2.

$xR[i,0]=xG[i,0]+\Delta xGR[i]$ $yR[i,0]=yG[i,0]+\Delta yGR[i]$ $xR[i,Len-1]=xG[i,Len-1]+\Delta xGR[i]$ $yR[i,Len-1]=yG[i,Len-1]+\Delta yGR[i]$ $xB[i,0]=xG[i,0]+\Delta xGB[i]$ $yB[i,0]=yG[i,0]+\Delta yGB[i]$ $xB[i,Len-1]=xG[i,Len-1]+\Delta xGB[i]$ $yB[i,Len-1]=yG[i,Len-1]+\Delta yGB[i]$ (Formula 2)

From these results, the mapping coordinates deriving means 108 works out the coordinates for the reading data position on each of the Ri, Gi and Bi lines—the mapping position coordinates on the memory 110. Therein, the k-th picture element coordinates [xG(i, k), yG(i, k)] on the Gi line from the top scanned position, the k-th picture element coordinates [xR(i, k), yR(i, k)] on the Ri line from the top scanned position and the k-th picture element coordinates [xB(i, k), yB(i, k)] on the Bi line from the top scanned position are given as in formula 3 where k=0, . . . , Len−1. Therein, [Δxr(i), Δyr(i)] represents the displacement in the X direction and the displacement in the Y direction for one picture element on the Ri line. Likewise, [Δxg(i), Δyg(i)] and [Δxb(i), Δyb(i)] represents the displacement in the X direction and the displacement in the Y direction for one picture element on the Gi and Bi lines.

$\Delta xg[i]=(xG[i,Len-1]-xG[i,0]+1)/Len$ $\Delta yg[i]=(yG[i,Len-1]-yG[i,0]+1)/Len$ $xG[i,k]=xG[i,0]+\Delta xg[i]\times k$ $yG[i,k]=yG[i,0]+\Delta yg[i]\times k$ $\Delta xr[i]=(xR[i,Len-1]-xR[i,0]+1)/Len$ $\Delta yr[i]=(yR[i,Len-1]-yR[i,0]+1)/Len$ $xR[i,k]=xR[i,0]+\Delta xr[i]\times k$ $yR[i,k]=yR[i,0]+\Delta yr[i]\times k$ $\Delta xb[i]=(xB[i,Len-1]-xB[i,0]+1)/Len$ $\Delta yb[i]=(yB[i,Len-1]-yB[i,0]+1)/Len$ $xB[i,k]=xB[i,0]+\Delta xb[i]\times k$ $yB[i,k]=yB[i,0]+\Delta yb[i]\times k$ (Formula 3)

The mapping means 109 relates the picture element coordinates obtained by the mapping coordinates deriving means—[xR(i, k), yR(i, k)] on the Ri line, [xG(i, k), yG(i, k)] on the Gi line, [xB(i, k), yB(i, k)] on the Bi line—to the mapping coordinates on the image memory 110—[XR(i, k), YR(i, k)], [XG(i, k), YG(i, k)], [XB(i, k), YB(i, k)].

And the k-th red data CR (i, k) obtained on the Ri line is mapped on the coordinates [XR(i, k), YR(i, k)]; the k-th green data CG (i, k) obtained on the Gi line, on the coordinates [XG(i, k), YG(i, k)]; and the k-th blue data CB (i, k) obtained on the Bi line, on the coordinates [XB(i, k), YB(i, k)]. This process is repeated to input an image data from the document for as displaying on CRT or storing in the hard disk until the reading of picture element data on the color document is over.

As set forth above, the first embodiment of the invention requires no delay buffer unlike the prior art and permits image reading just the same way regardless of the resolution of the image sensor array. Furthermore, the present embodiment eliminates the need to change the color data stored in the delay buffer accordingly as the scanning direction of the array changes, saving the manufacturing costs of the apparatus.

The aforesaid procedure is possible to achieve with such software as used in the computer etc. utilizing the central processing unit (CPU), digital signal processor (DSP) or the like. The present invention also can be applied to image scanners of the ordinary flat-bed type, for example, which are driven in one direction by a stepping motor.

Embodiment 2

Next, there will be described a second embodiment of the image reading apparatus and image reading method of the present invention.

FIG. 5 shows the configuration of the image reading apparatus as the second embodiment of the present invention. Referring to FIG. 5, the base color coordinates deriving means 500 works out all the coordinates on the image memory corresponding to the picture elements on the base sensor line that read the base color data.

The missing color coordinates deriving means 501 works out all the mapping coordinates for the color data, which have been read by the line reading means 102 but have been given no coordinates on the image memory. Those coordinates are worked out from the mapping coordinates for the base color data obtained by the base color coordinates deriving means 500.

There will now be explained the operation of the second embodiment of the reading apparatus thus built.

As in the image reading apparatus of the first embodiment, the red, green and blue color data are acquired through the image sensor array 100, line reading means 102 and shading correction means 105. Those color data are those that make up the image data at a position on the document where the image sensor array is located.

Then, using the pulses obtained from the encoders 101$a$ and 101$b$, the scanned position detection means 106 detects the top scanned position—the zeroth G sensor element on the i-th G sensor line in the sub-scanning direction—and the end scanned position—the (Len−1)th G sensor element on the same G sensor line.

The base color coordinates deriving means 500 works out the coordinates on the image space for the base color data read at the positions on the i-th sensor line in the sub-scanning direction. Since the image sensor array configuration is as shown in FIG. 2($a$), the median color or green data is selected as base color data. But other color data may be selected.

Then, the k-th picture element coordinates [xG(i, k), yG(i, k)] on the Gi sensor line from the top scanned position is calculated as in Formula 3, with the top scanned position on the Gi line given as [xG(i, 0), yG(i, 0)] and the end scanned position on the Gi line as [xG(i, Len−1), yG(i, Len−1)].

Figure 6A:
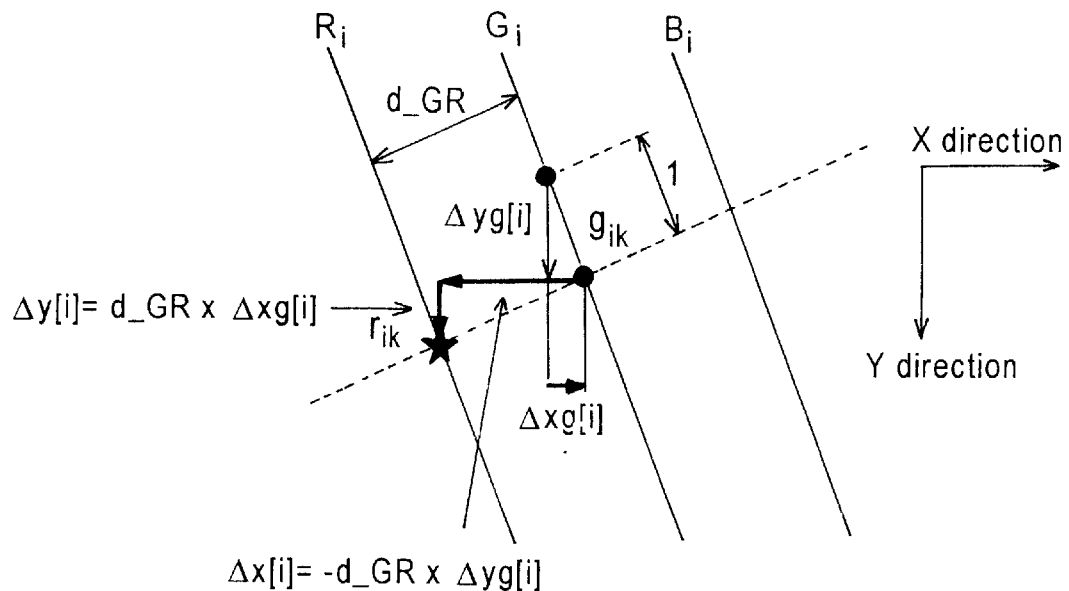
FIG. 6(a) is a schematic diagram showing the way of finding the position from the green sensor to the red sensor in the image reading apparatus of the second embodiment of the present invention.
Figure 6B:
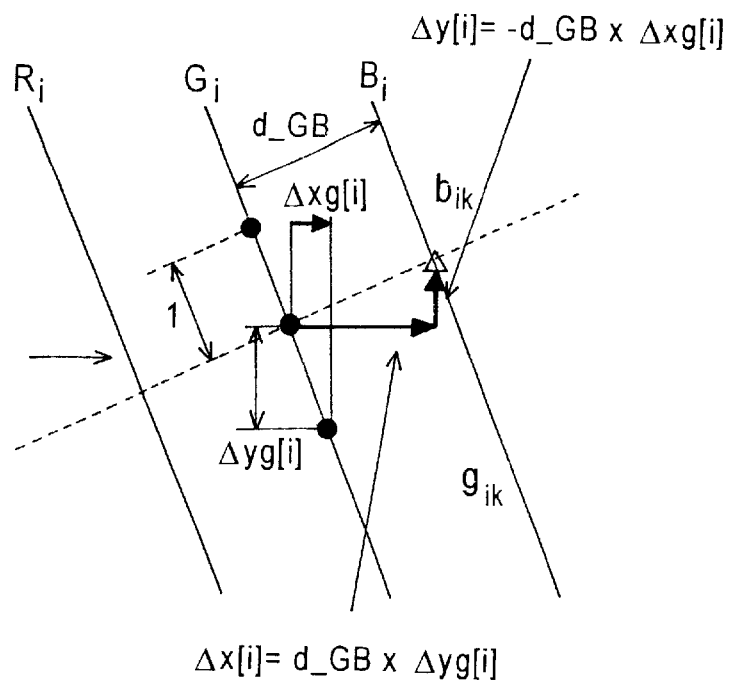
FIG. 6(b) is a schematic diagram showing the way of finding the position from the green sensor to the blue sensor on the image reading apparatus of the second embodiment of the present invention.

Receiving these results, the missing color coordinates deriving means 501 works out the mapping coordinates for the other data, that is, the red and blue data. The coordinates [xR(i, k), yR(i, k)] of the k-th picture element rik on the Ri line from the top scanned position and the coordinates [xB(i, k), yB(i, k)] of the k-th picture element bik on the Bi line from the top scanned position are found from the coordinates [xG(i, k), yG(i, k)] of the k-th picture element on the Gi line from the top scanned position where k=0, . . . , Len−1). As shown in FIG. 6, the amount of movement from gik to rik, bik can be found using the displacement Δxg (i) in the X direction and the displacement Δyg(i) in the Y direction for one picture element on the Gi line. The results are as shown in Formula 4.

$$xR[i,k]=xG[i,k]-\Delta yg[i]\times d\_GR$$

$$yR[i,k]=yG[i,k]+\Delta xg[i]\times d\_GR$$

$$xB[i,k]=xG[i,k]+\Delta yg[i]\times d\_GB$$

$$yB[i,k]=yG[i,k]-\Delta xg[i]\times d\_GB \quad \text{(Formula 4)}$$

As in the image reading apparatus in the first embodiment of the present invention, the image data is mapped by the mapping means 109 to the image memory 110 as for display on CRT.

As set forth above, the present invention requires no delay buffer unlike the prior art and keeps down manufacturing costs even if the image sensor array is increased in resolution.

Color data obtained from the line reading means along with the scanned positions could be stored and then processed in the lump. That could be done this way. A holding buffer is provided between the base coordinates deriving means 500 and the missing color coordinates deriving means 501. Just as much aforesaid color data and calculated base color coordinates needed for the number of lines are stored in the buffer. Then the coordinates for the color data with no scanned positions detected by the missing color coordinates deriving means 501—by much coordinates for the base color coordinates held above—can be worked out in a step.

While that leaves the process not real time, it is convenient when reading data is held in as small a size as possible. That also makes it possible to read data through a network by compressing the data holded in the holding buffer.

The aforesaid procedure is possible to achieve with such software as used in the computer etc. utilizing the central processing unit (CPU), digital signal processor (DSP) or the like.

The present invention also can be applied to image scanners of the ordinary flat-bed type, for example, which are driven in one direction by a stepping motor.

Embodiment 3

There will be described a third embodiment of the image reading apparatus and image reading method of the present invention.

FIG. 7 shows the configuration of the image reading apparatus as the third embodiment of the present invention. The interlinear interpolation means 700 puts in interpolated data between color data obtained by the mapping coordinates deriving means 108. A second mapping means 701 maps read color data at the ng mapping coordinates obtained by the mapping coordinates deriving means 108, and also at the interpolated coordinates position the respective color interpolation data obtained by the interlinear interpolation means 700.

There will now be explained the operation of the third embodiment of the reading apparatus thus built. As in the image reading apparatus of the first embodiment, the line reading means 102 reads color data, and the top scanned position and end scanned position of green data obtained by the encoders are used to find the top scanned position and end scanned position of the other color data, that is, red and blue data. After that, the mapping space coordinates for the respective color data are found. The process up to that point is the same as that in the first embodiment, and the details will not be repeated.

The interlinear interpolation means 700 puts in interpolated data between the lines for the respective color data, that is, the image data actually read in.

Figure 8:
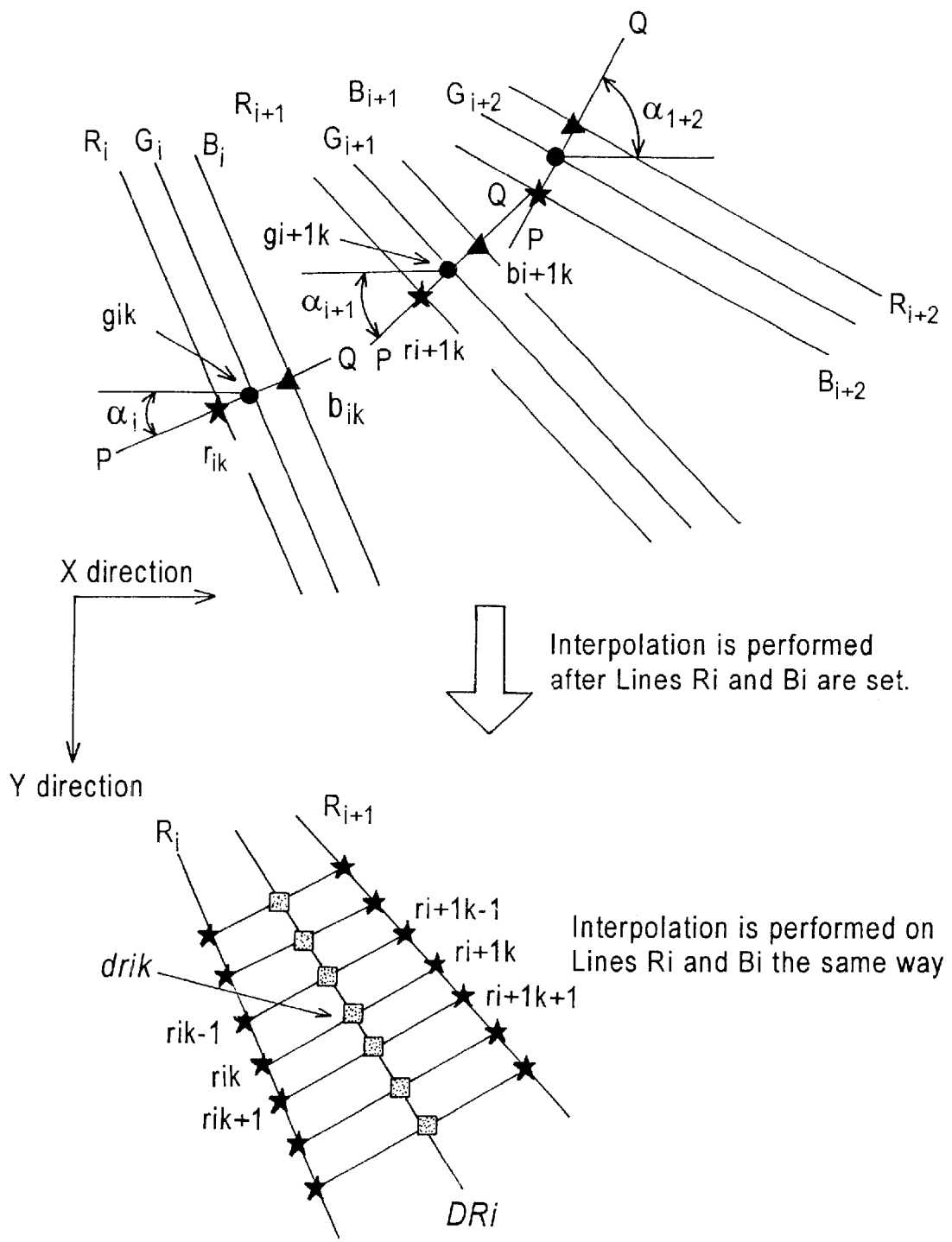
FIG. 8 is a schematic diagram showing the interpolation procedure being performed by interlinear interpolation means on the image reading apparatus of the third embodiment of the present invention.

FIG. 8 outlines the interpolation. In FIG. 8, Ri denotes the i-th R sensor line from the reading starting-point in the sub-scanning direction, Gi the i-th G sensor line, and Bi the i-th B sensor line.

And gik denotes the k-th picture element on the Gi line from the top scanned position, rik the k-th picture element on the Ri line from the top scanned position, and bik the k-th picture element on the Bi line from the top scanned position.

The picture element coordinates on the Ri and Bi lines can be found from those on the Gi by Formulae 1, 2 and 3 using the angle αi formed by the perpendicular PQ to the i-th sensor line with the x(horizontal direction), the d-GR picture element distance or the distance between the G and R sensor lines, and the d-GB picture element distance or the distance between the G and B sensor lines.

The interlinear interpolation means 700 first picks out the Ri line and the Ri+1 line and generates an interpolation line DRi on the median line between the two lines. The coordinates [xDR(i, k), yDR(i, k)] at which the interpolation picture element for the color data is mapped is given in Formula 5 with the coordinates of the picture element rik on the Ri line as [xR(i, k), yR(i, k)] and with the coordinates of the picture element ri+1k on the Ri+1 line as [xR(i+1, k), yR(i+1, k)].

$$xDR[i,k]=(xR[i,k]+xR[i+1,k])/2$$

$$yDR[i,k]=(yR[i,k]+yR[i+1,k])/2$$

$$xDG[i,k]=(xG[i,k]+xG[i+1,k])/2$$

$$yDG[i,k]=(yG[i,k]+yG[i+1,k])/2$$

$$xDB[i,k]=(xB[i,k]+xB[i+1,k])/2$$

$$yDB[i,k]=(yB[i,k]+yB[i+1,k])/2 \quad \text{(Formula 5)}$$

The interpolation color data CDR (i, k) for the interpolation picture element drik is given in Formula 6 with the color data of the picture element rik on the Ri line as CR(i,k) and with the color data of the picture element ri+1k on the Ri+1 line as CR (i+1, k).

$$CDR[i,k]=(CR[i,k]+CR[i+1,k])/2$$

$$CDG[i,k]=(CG[i\ k]+CG[i+1,k])/2$$

$$CDB[i,k]=(CB[i,k]+CB[i+1,k])/2 \quad \text{(Formula 6)}$$

The same procedure is performed on data on the Gi and Bi line, too. Likewise, the coordinates [xDG(i, k), yDG(i, k)] where the interpolation picture element dgik on the Gi line is mapped and the coordinates [xDB(i, k), yDB(i, k)] where the interpolation picture element dbik on the Gi line is mapped can be worked out by Formula 5, with the coordinates of the picture element gik on the Gi line as [xG(i, k), yG(i, k)], with the coordinates of the picture element gi+1k on the Gi line as [xG(i+1, k), yG(i+1, k)], with the coordinates of the picture element bik on the Bi line as [xB(i, k), yB(i, k)], and with the coordinates of the picture element bi+1k on the Bi+1 line as [xB(i+1, k), yB(i+1, k)].

And the interpolation data CDG (i, k) of the interpolation picture element dgik on the Gi line and the interpolation data CDB (i, k) of the interpolation picture element dgik on the Bi line can also be obtained from Formula 6, with the color data of the picture element gik on the Gi line as CG (i, k), with the color data of the picture element gi+1k on the Gi+1 line as CG (i+1, k), with the color data of the picture element gik on the Bi line as CB (i, k), and with the color data of the picture element bi+1k on the Bi+1 line as CB (i+1, k).

The second mapping means 701 maps the respective read data obtained by the line reading means 102 on the respective mapping coordinates acquired by the mapping coordinates deriving means 108. At the same time, the means 701 maps at the respective interpolation coordinates the interpolation data between the Ri, Gi and Bi lines.

As set forth above, the present embodiment requires no delay buffer unlike the prior art and keeps down the costs even if the image sensor array is increased in resolution.

With the prior art image reading apparatus with three sensor lines, data is not mapped well on the image memory unless three color data for the same picture elements are ready. In case the image sensor array is handled manually, the scanning speed is not always uniform but can fluctuate greatly, resulting in such image detects as mismapping and edge tm color misregistration at the edge of black and while character images. In the present embodiment of the invention, red, green and blue colors are mapped separately, and even if there is misreading in the line information because of uneven movement of the image sensor array, vacancies in data can be made up with interpolation data, which keeps down color misregistration and image mismapping.

The aforesaid procedure is possible to achieve with such software as used in the computer etc. utilizing the central processing unit (CPU), digital signal processor (DSP) or the like.

The present invention also can be applied to image scanners of the ordinary flat-bed type, for example, which are driven in one direction by a stepping motor.

Embodiment 4

A fourth embodiment of the image reading apparatus and image reading method of the present invention will be described.

FIG. 9 is a block diagram showing the configuration of the image reading apparatus of the fourth embodiment. As shown in FIG. 9, the fourth embodiment is the image reading apparatus of the second embodiment combined with the interlinear interpolation means 700 and the second mapping means 701, both means part of the image reading apparatus of the third embodiment.

In the image reading apparatus of the fourth embodiment thus built, the line reading means 102 reads red, green and blue color data, while the coordinates on the mapping space for green data are worked out on the basis of the top and end scanned positions obtained by the encoders.

And the mapping coordinates for red and blue data of which the scanned positions have not been detected are worked out from the mapping coordinates of the green data.

Then, interpolation is performed on each of the three colors. This step is to put in interpolation data for the respective color data between the (i +1)th line where the sensor array is currently located and the previous i-th line. The second mapping means 701 reads the color data and interpolation color data and maps the same on the image memory 110. That way, an image is inputted.

The present embodiment of the invention requires no delay buffer unlike the prior art and can cope with an increase in the resolution of image sensor. For a change in the scanning direction of the array, furthermore, this embodiment eliminates the necessity of adding a complicated circuit to change color data to be held in the delay buffer.

As in the third embodiment, in addition, it is possible to fill up vacancies in line information with interpolation data—information misread because of changes in the scanning speed of the image sensor array—, thus reducing color misregistration and mismapping.

Also, as in the second embodiment, it is possible to read data through the network this way. A holding buffer is provided between the base color coordinates deriving means 500 and the missing color coordinates deriving means 501 so as to hold the aforesaid color data and calculated base color coordinates just for the number of lines needed to be stored in advance.

The aforesaid procedure is possible to achieve with such software as used in the computer etc. utilizing the central processing unit (CPU), digital signal processor (DSP) or the like. The present invention also can be applied to image scanners of the ordinary flat-bed type, for example, which are driven in one direction by a stepping motor.

Embodiment 5

There will first be described the image reading apparatus and image reading method of the fifth embodiment of the present invention.

FIG. 10 is a block diagram of the image reading apparatus of the fifth embodiment.

On-the-actual-line interpolation means 1000 is to put in interpolation data for the respective color data on the sensor lines Ri, Gi, Bi that the sensor array 100 is now reading.

Third mapping means 1001 maps the respective reading color data on the reading maps obtained by the mapping coordinate deriving means 108 and maps the interpolation data for the color data at the interpolation. coordinates for the respective colors acquired by the interlinear interpolation means 700. The mapping means 1001 also maps the interpolation data for colors at the interpolation coordinates on the respective sensor lines: acquired by the on-the-actual-line interpolation means 100 and now being read.

There will now be explained the operation of the image reading apparatus of the fifth embodiment. The line reading means reads color data, while the top and end scanned positions of red and blue data are worked out from the top and end scanned positions of green data acquired by the encoders.

The subsequent process up to putting in interpolation data for the respective data between the respective sensor lines is identical with that in the third embodiment of the present invention, and no description thereof will be repeated.

Figure 11:
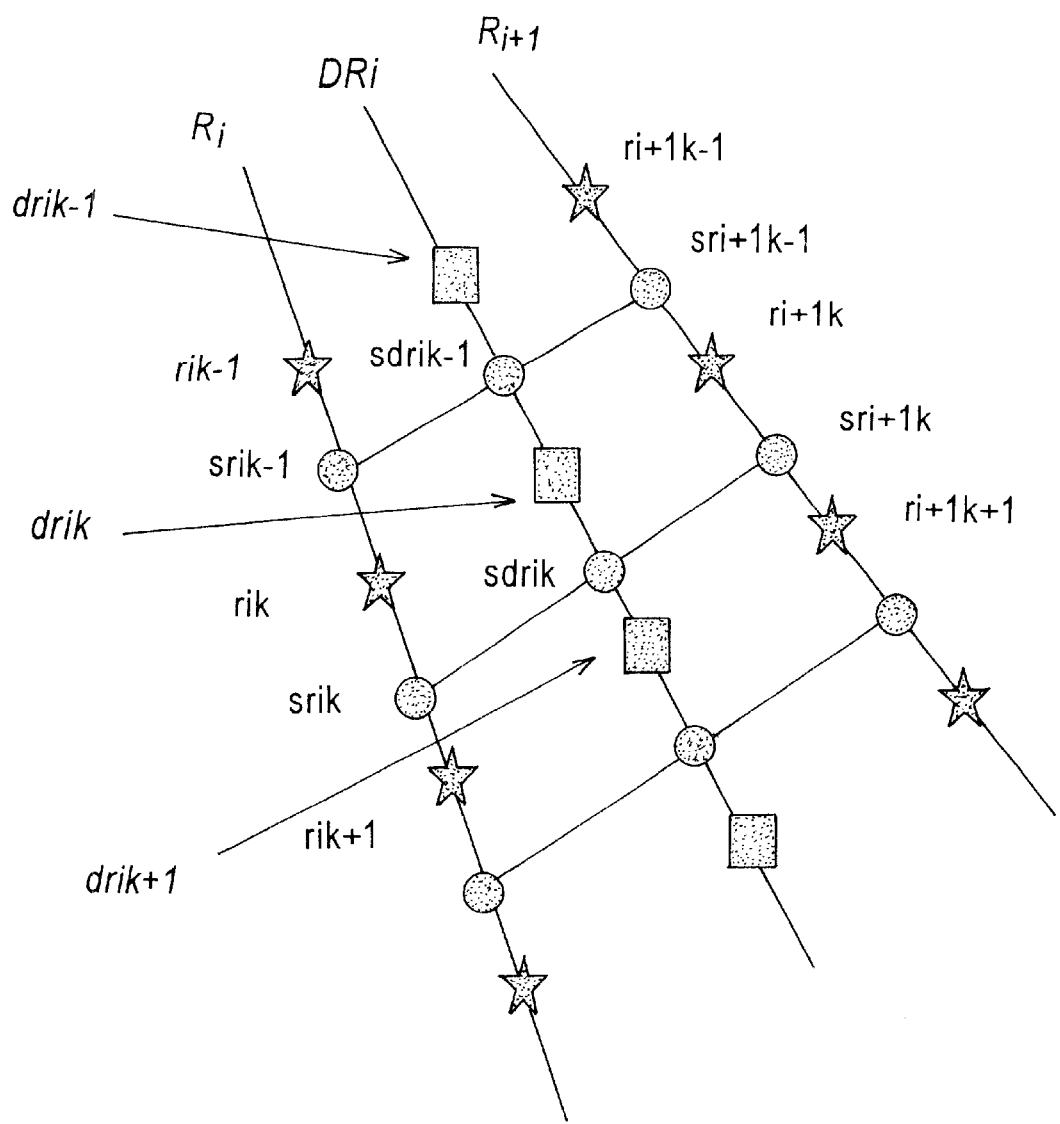
FIG. 11 is a schematic diagram showing the interpolation procedure being performed by on-the-actual-line interpolation means in the image reading apparatus of the fifth embodiment of the present invention.

The on-the-actual-line means 1000 puts in interpolation color data between the color data which are now being read on the sensor lines as shown in FIG. 11. Referring to FIG. 11, Ri+1 and Ri indicate (i+1)th R sensor line now being read and the preceding or i-th R sensor line, and DRi denotes the interpolation R sensor line between the Ri+1 and Ri lines obtained by the interlinear interpolation means 700.

And rik, rik+1 indicate the k-th and (k+1)th picture elements from the top scanned position on the Ri line while drik denotes the k-th picture element on the DRi line from the top scanned position. With the interpolation picture element between the picture elements rik and rik+1 on the Ri line as srik, the coordinates [xSR(i, k), ySR(i, k)] of srik can be drawn as in Formula 7 from the coordinates [xR(i, k), yR(i, k)] of the picture element rik and the coordinates [xR(i, k+1), yR(i, k+1)] of the picture element rik+1.

$xSR[i,k]=(xR[i,k]+xR[i,k+1])/2$ $ySR[i,k]=(yR[i,k]+yR[i,k+1])/2$ $xSG[i,k]=(xG[i,k]+xG[i,k+1])/2$ $ySG[i,k]=(yG[i,k]+yG[i,k+1])/2$ $xSB[i,k]=(xB[i,k]+xB[i,k+1])/2$ $ySB[i,k]=(yB[i,k]+yB[i,k+1])/2$ (Formula 7)

And with the color data for the picture element rik on the Ri line as CR (i, k) and the color data for the picture element rik+1 as CR (i, k+1), the interpolation color data CSR (i, k) for the interpolation picture element srik on the Ri line is given as in Formula 8.

$CSR[i,k]=(CR[i,k]+CR[i,k+1])/2$ $CSG[i,k]=(CG[i,k]+CG[i,k+1])/2$ $CSB[i,k]=(CB[i,k]+CB[i,k+1])/2$ (Formula 8)

Likewise, from the k-th interpolation picture element drik from the top scanned position on the interpolation line DRi between the Ri line and the Ri+1 line and the (k+1)th interpolation picture element drik+1 from the top scanned position, it is possible to work out the coordinates of the interpolation picture element sdrik therebetween and the interpolation data.

The same procedure is performed on data on the Gi and Bi line, too. The third mapping means, 1001 maps the respective data read by the line reading means 102 at the coordinates on the image memory 110 corresponding to the respective mapping coordinates obtained by the mapping coordinates deriving means 108. And the means 1001 maps at the respective interpolation coordinates the interpolation data obtained by the interlinear interpolation means 700 between the Ri, Gi and Bi lines. Then, the means 1001 maps at the coordinates corresponding to the interpolation coordinates the interpolation data on the Ri, Gi and Bi lines obtained by the on-the-actual-line interpolation means 1000. That way, the color data obtained by the image sensor array is inputted.

As set forth above, the present invention requires no delay buffer unlike the prior art and keeps down the manufacturing costs even if the image sensor array is increased in resolution. Furthermore, red, green and blue colors are mapped separately, and interpolation data are put in not only in the scanning direction of the image sensor array, that is, the subscanning direction but also in the direction of the sensor line to make up for image defects caused by changes in the scanning direction as well as the scanning speed of the image sensor array.

The aforesaid procedure is possible to achieve with such software as used in the computer etc. utilizing the central processing unit (CPU), digital signal processor (DSP) or the like. The present invention also can be applied to image scanners of the ordinary flat-bed type, for example, which are driven in one direction by a stepping motor.

Embodiment 6

A sixth embodiment of the image reading apparatus and image reading method of the present invention will be described in the following.

FIG. 12 is a block diagram showing the configuration of the image reading apparatus of the sixth embodiment of the invention. As shown in FIG. 12, the sixth embodiment is the image reading apparatus of the fourth embodiment combined with the on-the-actual-line interpolation means 1000 and the third mapping means 101, both means part of the image reading apparatus of the fifth embodiment.

In the image reading apparatus of the sixth embodiment thus built, the line reading means 102 reads red, green and blue color data, and the mapping space coordinates for the green data are worked out from the top and end scanned positions obtained by the encoders.

And mapping coordinates for red and blue colors of which the scanned positions have not been detected are found from the mapping coordinates for the green data.

Then, interpolation is performed on each of the three colors. In this step, the interlinear interpolation means 700 puts in interpolation data between the (i+1)th line where the sensor array is currently located and the previous i-th line.

After that, the on-the-actual-line interpolation means 1000 puts in interpolation data between the data on the respective lines now being read. The third mapping means 1001 puts in color data—read color data, interpolation color data between the lines in the sub-scanning direction and interpolation color data on the current sensor line—at the corresponding coordinates on the image memory 110.

The present embodiment of the invention requires no delay buffer unlike the prior art and can cope with an increased resolution in image sensor. For a change in the scanning direction of the array, furthermore, this embodiment eliminates the necessity of adding a complicated circuit to change color data to be held in the delay buffer.

As in the third embodiment of the invention, even if there is misreading in the line information because of uneven movement of the image sensor array, vacancies in data can be made up with interpolation data, which keeps down color dislocation and image mismapping.

Also, if there are provided a holding buffer between the base color coordinates deriving means 500 and the missing color coordinates deriving means 501 as in the second embodiment to hold the base color data and the base coordinates for the number of lines needed to be stored in advance, it is possible to read data through the network as in the second embodiment of the present invention.

The aforesaid procedure is possible to achieve with such software as used in the computer etc. utilizing the central processing unit (CPU), digital signal processor (DSP) or the like. The present invention also can be applied to image scanners of the ordinary flat-bed type, for example, which are driven in one direction by a stepping motor.
Embodiment 7

A seventh embodiment of the image reading apparatus and image reading method of the present invention will be now described.

FIG. 13 a block diagram showing the configuration of the image reading apparatus of the seventh embodiment.

Referring to FIG. 13, red coordinates deriving means 1300 derives the coordinates to be occupied on the image memory 110 by the red data read by the line reading means 102.

Likewise, green coordinates deriving means 1301 derives the mapping coordinates to be occupied on the image memory 110 by the green data read by the line reading means 102. Blue coordinates deriving means 1302 derives the mapping coordinates to be occupied on the image memory 110 by the blue data read by the line reading means 102.

In the image reading apparatus of the seventh embodiment thus constituted, the line reading means 102 reads color data for red, green and blue, while the scanned positions are detected through the scanned position detection means—the scanned positions for the respective color data obtained from the three-sensor line array.

Using the scanned position information obtained from the scanned position detection means 106, the red coordinates deriving means 1300 derives the mapping coordinates to map on the image memory 110 the red data read by the line reading means 102.

Likewise, using the scanned position information obtained from the scanned position detection means 106, the green coordinates deriving means 1301 derives the mapping coordinates to map on the image memory 110 the green data read by the line reading means 102 and the blue coordinates deriving means 1302 derives the mapping coordinates to map on the image memory 110 the blue data read by the line reading means 102. The respective color coordinates deriving means 1300, 1301, 1302 derive the coordinates for the respective color data independently.

And as in the image reading apparatus of the first embodiment, the mapping means 109 commits color data to coordinates on the image memory 110 as for display on CRT.

The present embodiment of the invention requires no delay buffer unlike the prior art and can cope with an increase in resolution of image sensor array. For a change in the scanning direction of the array, furthermore, this embodiment eliminates the necessity of adding a complicated circuit to change color data to be held in the delay buffer.

The aforesaid procedure is possible to achieve with such software as used in the computer etc. utilizing the central processing unit (CPU), digital signal processor (DSP) or the like. The present invention also can be applied to image scanners of the ordinary flat-bed type, for example, which are driven in one direction by a stepping motor.
Embodiment 8

A eighth embodiment of the image reading apparatus and image reading method of the present invention will be described next.

FIG. 14 is a block diagram showing the configuration of the image reading apparatus of the eighth embodiment. The stripe image sensor 1400 has a three-color stripe filter pasted over the light intake face. The second line reading means 1401 is so designed as to read data on a plurality of kinds of colors by means of the sensor line on the stripe image sensor 1400.

The specific color scanned positions detection means 1402 detects the scanned positions for all the green data read at the current position of the sensor. And the sensor-direction offset size deriving means 1403 works out the offset size in the direction of the sensor line at the current i-th line to find the coordinates for the remaining red and blue data from the scanned positions for the respective green data.

Using the offset size in the direction of the sensor from the sensor-direction offset size deriving means 1403, the second mapping coordinate deriving means 1404 derives the positions for the remaining red and blue data from the scanned positions for the respective green data detected by the specific color scanned position detection means 1402. Then, the data is mapped at the corresponding coordinates on the image memory 110.

In the image reading apparatus of the eighth embodiment thus constituted, the stripe image sensor 1400 and the second reading means 1401 read the respective color data for red, green and blue.

The stripe image sensor 1400 has red, green and blue sensor elements lined up on a stripe. The second line reading means 1401 reads color data with those sensor elements on the stripe.

Meanwhile, the encoders and the specific color scanned position detection means 1402 detects the scanned positions for the respective green data read on the i-th line, that is, the current position of the stripe image sensor 1400.

Figure 15A:
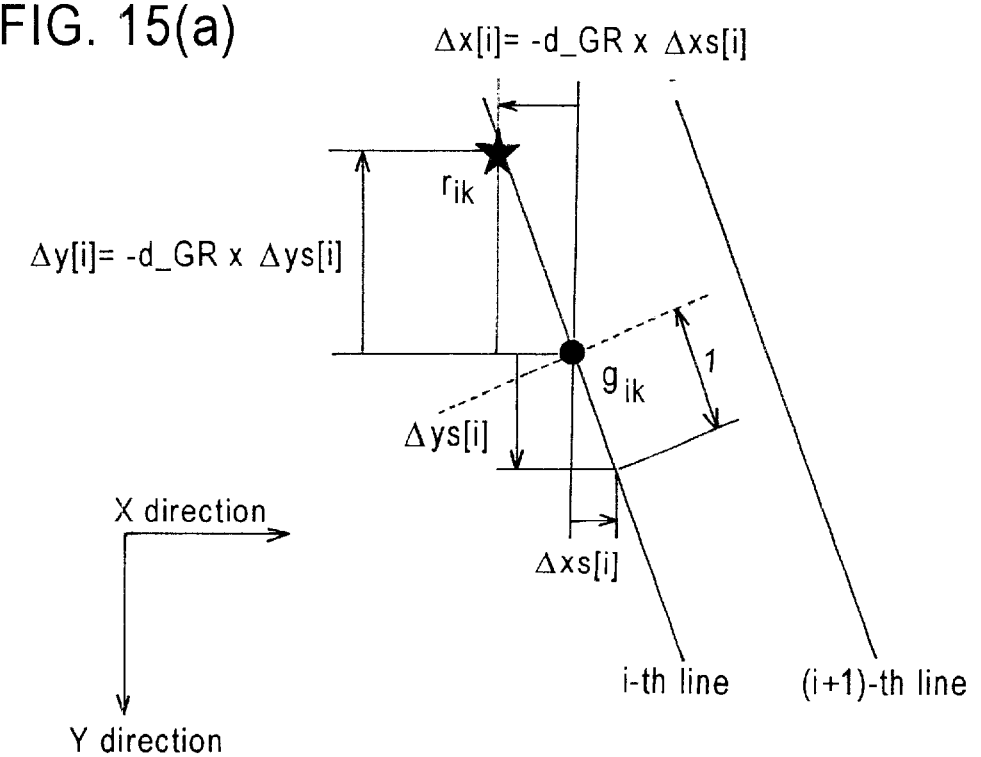
FIG. 15 is a schematic diagram showing the offset size in the sensor-direction in the sensor-direction offset size deriving means of the image reading apparatus of the eighth embodiment of the present invention.
Figure 15B:
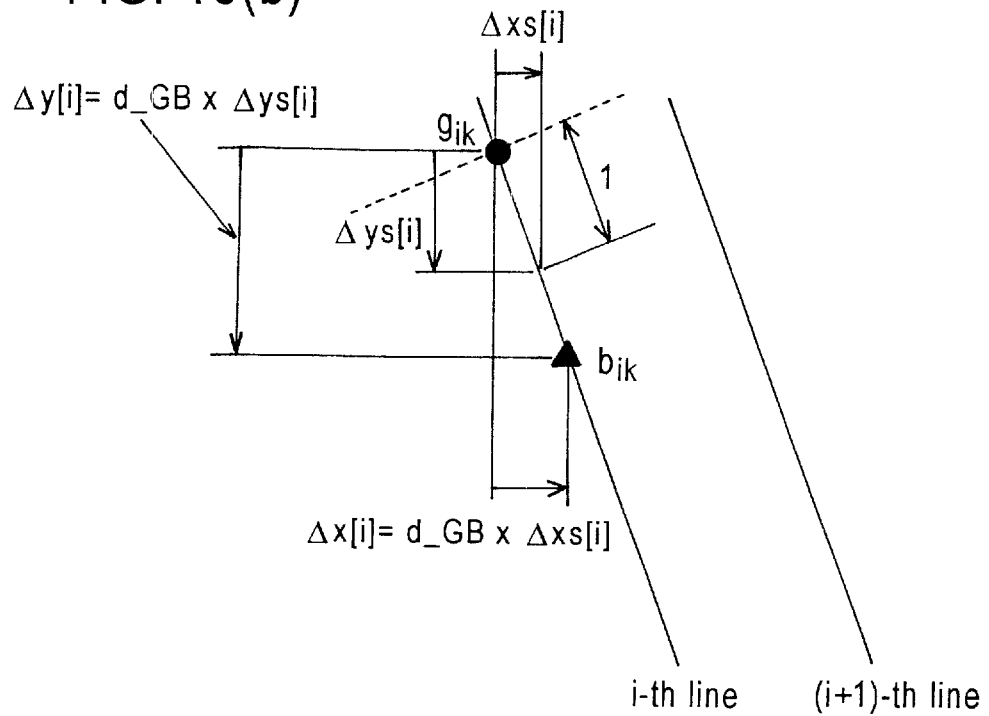
Figure 16:
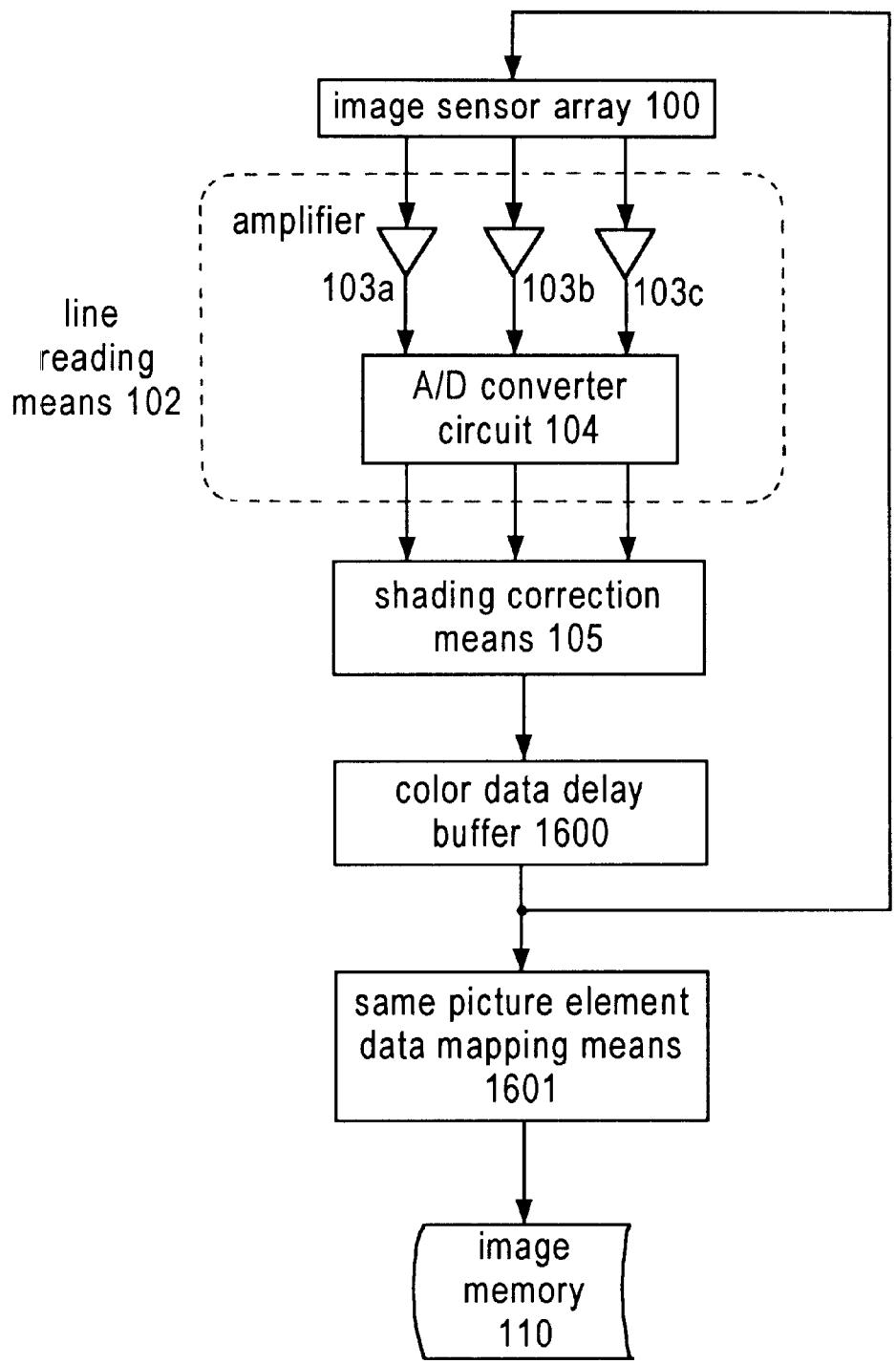
FIG. 16 is a block diagram showing the arrangements of a prior art image reading apparatus of the simultaneous reading three-line type.
Figure 17:
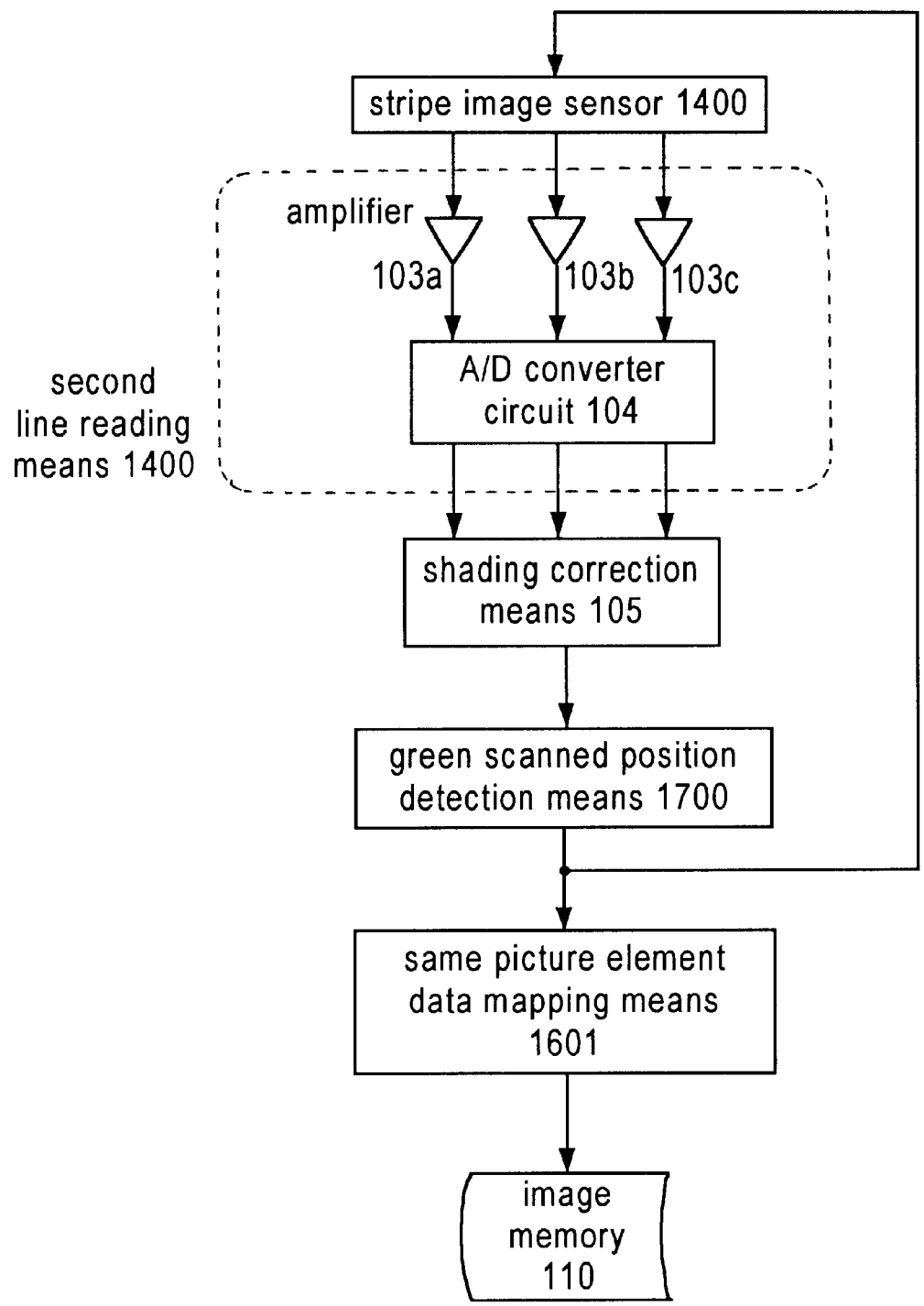
FIG. 17 is a block diagram showing the arrangements of a prior art image reading apparatus of the stripe reading type.

And from the respective green data coordinates, the sensor-direction offset size deriving means 1402 works out the offset size [$\Delta x(i), \Delta y(i)$] in the direction of the sensor line—the main scanning direction—, as shown in FIG. 15, to derive the coordinates for the remaining red and blue data disposed on the stripe.

Here, the coordinates of the red data rik at the k-th picture element on the i-th line is given as [$xR(i, k), yR(i, k)$], the coordinates of the green data gik as [$xG(i, k), yG(i, k)$], the coordinates of the green data bik as [xB(i, k), yB(i, k)], and the displacements in the X and Y directions of one picture element on the i-th line are given as [Δxs(i), Δys(i)].

And the second mapping coordinates deriving means 1402 works out the coordinates for the remaining red and blue data rik and bik by adding it) that offset size to the coordinates for the respective green data obtained at the means 1402 as in Formula 9.

$$xR[i,k]=xG[i,k]-\Delta xs[i]\times d\_GR$$
$$yR[i,k]=yG[i,k]-\Delta ys[i]\times d\_GR$$
$$xB[i,k]=xG[i,k]+\Delta xs[i]\times d\_GB$$
$$yB[i,k]=yG[i,k]+\Delta ys[i]\times d\_GB \quad \text{(Formula 9)}$$

Finally, the mapping means 109 maps the respective color data at the corresponding coordinates on the image memory 110. That way, images are inputted.

The present embodiment maps the respective color data read by the sensor of the stripe reading type preciously at the position where the data was read, thus reducing the effects of stripe color misregistration and keeping the read data from going down in quality.

The aforesaid procedure is possible to achieve with such software as used in the computer etc. utilizing the central processing unit (CPU), digital signal processor (DSP) or the like. The present invention also can be applied to image scanners of the ordinary flat-bed type, for example, which are driven in one direction by a stepping motor.

In the embodiments that have just been decried, the specific scanned positions to be detected by the scanned position detection means are the top and end scanned positions. That is not restrictive. What is required is to specify the position of the data sensed. The scanned position detection means can detect other scanned positions as, for example, the center and the head of the sensor.

In those embodiments, the green data serves as basis for deriving the coordinates for the other color data. In stead of the green data, the red or blue data may be detected by the scanned position detection means 106 and may be used to find the coordinates.

What is claimed is:

1. An image reading apparatus comprising:
    line reading means having a plurality of sensor lines, one for one kind of color, disposed at a specific interval, said means reading color data on a plurality of colors simultaneously by scanning a color document,
    scanned position detection means for detecting the scanned positions for said respective read color data,
    coordinates deriving means for deriving the coordinates to be occupied on an image memory by the respective color data read by said line reading means, wherein different coordinates are derived for different picture elements corresponding to the respective color data on the basis of the scanned positions detected by said scanned position detection means, and
    mapping means for mapping the respective read data at the coordinates on the image memory obtained by said coordinates deriving means.

2. The image reading apparatus as defined in claim 1, wherein said scanned position detection means detects the scanned positions for specific data on a specific color out of said read color data and said coordinates deriving means is additionally provided with:
    offset size deriving means for working out, on the basis of a specific scanned position detected by said scanned position detection means, the offset size, from said specific scanned position, at the scanned position corresponding to said specific scanned position of the respective color data on the other specific colors with their scanned positions not detected, and
    mapping coordinates deriving means for deriving the scanned positions for all color data read by said plurality of sensor lines on the basis of the offset size obtained by said offset size deriving means and for working out the coordinates to be occupied on the image memory by all color data.

3. The image reading apparatus as defined in claim 2, wherein said specific scanned positions are the top scanned position and the end scanned position.

4. The image reading apparatus as defined in claim 1, wherein said scanned position detection means detects a specific position for color data on a specific color out of said read color data and said coordinates deriving means is additionally provided with:
    base color coordinates deriving means for working out the picture element coordinates to be occupied on the image memory by all the scanned positions for the color data on said specific color on the basis of said specific scanned positions on the sensor line where the color data on said specific color is detected by said scanned position detection means, and
    missing color coordinates deriving means for working out coordinates—on the image memory for all color data on the other colors than said specific color out of the plurality of color data read by said line reading means—from the picture element coordinates of color data on the specific color obtained by the base color coordinates deriving means.

5. The image reading apparatus as defined in claim 4, wherein said specific scanned positions are the top scanned position and the end scanned position.

6. The image reading apparatus as defined in claim 1, wherein said scanned position detection means detects the respective scanned positions for said respective read color data and there are provided with:
    said coordinates deriving means for separately and independently deriving the respective coordinates—to be occupied on the image memory for all color data on a plurality of colors read by said line reading means—using the scanned positions detected by said scanned position detection means.

7. An image reading apparatus comprising:
    second line reading means having sensor elements for reading a plurality of colors disposed in a line at a specific interval, said means reading color data on a plurality of colors simultaneously by scanning a color document,
    specific color scanned position detection means for detecting all scanned positions corresponding to color data on a specific color out of said plurality of read color data,
    coordinates deriving means for deriving different coordinates—to be occupied on an image memory for the respective color data read by said line reading means—for different picture elements corresponding to the respective color data on the basis of the scanned positions detected by said scanned position detection means, and
    mapping means for mapping the respective read data at the coordinates on the image memory obtained by said coordinates deriving means.

8. The image reading apparatus as defined in claim 7, wherein said coordinates deriving means is further provided with:

sensor direction offset size deriving means for working out the offset size—between the sensor elements to find the scanned positions of the other color data with the scanned positions not detected—on the basis of the scanned position detected by said specific color scanned position detection means, and second mapping coordinates deriving means for working out the picture element coordinates to be occupied on the image memory for all color data read by the one sensor line on the basis of the offset size read in the sensor direction by said sensor direction offset size deriving means.

9. An image reading apparatus comprising:

line reading means having a plurality of sensor lines, one for one kind of color, disposed at a specific interval, said means reading color data on a plurality of colors simultaneously by scanning a color document, scanned position detection means for detecting the scanned positions corresponding to said respective read color data, coordinates deriving means for deriving different coordinates—to be occupied on an image memory for the respective color data read by said line reading means—different picture elements corresponding to the respective data on the basis of the scanned position detected by said scanned position detection means, and interpolation means for working out interpolation color data at the coordinates between the coordinates derived by said coordinate deriving means, and mapping means for mapping the respective read data at the coordinates on the image memory obtained by said coordinates deriving means and at the same time mapping interpolation color data at the coordinates obtained by the interpolation means.

10. The image reading apparatus as defined in claim 9, wherein said interpolation means interpolates color data at coordinates intermediates between the two neighboring picture element coordinates on the same sensor line and/or at coordinates intermediate between the two neighboring and corresponding picture element coordinates obtained on the two neighboring sensor lines.

11. The image reading apparatus as defined in claim 9, wherein said scanned position detection means detects the scanned positions for specific data on a specific color out of said read color data and said coordinates deriving means is additionally provided with:

offset size deriving means for working out, on the basis of specific scanned positions detected by said scanned position detection means, the offset size from said specific scanned positions to the scanned position of the respective color data on the other specific colors with their scanned positions not detected, said scanned position corresponding to said specific scanned position, and mapping coordinates deriving means for deriving the scanned positions for all color data read by said plurality of sensor lines on the basis of the offset size obtained by said offset size deriving means and working out the coordinates to be occupied on the image memory for all colors, wherein:

said interpolation means interpolates color data at coordinates intermediate between the coordinates of the corresponding picture element obtained on the two neighboring sensor lines.

12. The image reading apparatus as defined in claim 9, wherein said scanned position detection means detects the scanned positions for specific, data on a specific color out of said read color data and said coordinates deriving means is additionally provided with:

offset size deriving means for working out, on the basis of specific scanned positions detected by said scanned position detection means, the offset size from said specific scanned positions to the scanned position of the respective color data on the other specific colors with their scanned positions not detected, said scanned position corresponding to said specific scanned position, and mapping coordinates deriving means for deriving the scanned positions for all color data read by said plurality of sensor lines on the basis of the offset size obtained by said offset size deriving means and working out the coordinates to be occupied on the image memory for all colors, wherein:

said interpolation means interpolates color data at coordinates intermediate between the neighboring two picture element coordinates on the same sensor line and at coordinates intermediate between the two neighboring and corresponding picture element coordinates obtained on the two neighboring sensor lines.

13. The image reading apparatus as defined in claim 9, wherein said scanned position detection means detects the scanned positions for specific data on a specific color out of said read color data and said coordinates deriving means is additionally provided with:

base color coordinates deriving means for working out the picture element coordinates to be occupied on the image memory by all the scanned positions for the color data on said specific color on the basis of said specific scanned positions on the sensor line where the color data on said specific color is detected by said scanned position detection means, and missing color coordinates deriving means for working out coordinates—on the image memory for all color data on the other colors than said specific color out of the plurality of color data read by said line reading means—from the picture element coordinates of color data on the specific color obtained by the base color coordinates deriving means wherein:

said interpolation means interpolates the color data for the coordinates intermediate between the coordinates of the corresponding picture element obtained on the two neighboring sensor lines.

14. The image reading apparatus as defined in claim 9, wherein said scanned position detection means detects the scanned positions for specific data on a specific color out of said read color data and said coordinates deriving means is additionally provided with:

base color coordinates deriving means for working out the picture element coordinates to be occupied on the image memory by all the scanned positions for the color data on said specific color on the basis of said specific scanned positions on the sensor line where the color data on said specific color is detected by said scanned position detection means, and missing color coordinates deriving means for working out coordinates—on the image memory for all color data on the other colors than said specific color out of the plurality of color data read by said line reading means—from the picture element coordinates of color data on the specific color obtained by the base color coordinates deriving means wherein:

said interpolation means interpolates the color data for the coordinates intermediate between the neighboring two picture element coordinates on the same sensor line and at the coordinates intermediate between the two neighboring and corresponding picture element coordinates obtained on the two neighboring sensor lines.

15. An image reading method, which comprises:

simultaneously reading color data on a plurality of colors by scanning a color document with a plurality of lines of sensor elements, one line for one kind of color, disposed side by side at a specific interval, detecting the scanned positions for the respective color data and, on the basis of the detected scanned positions, deriving different coordinates—to be occupied on the image memory for said read color data for a plurality of colors—for different picture elements corresponding to the respective data, and mapping said respective read color data at said coordinates obtained on the image memory.

16. The image reading method as defined in claim 15, which comprises:

detecting the scanned positions corresponding to specific color data on a specific color out of said read color data, and working out, on the basis of specific scanned positions detected by said scanned position detection means, the offset size from said specific scanned position to the scanned position of the respective color data on the other specific colors with their scanned positions not detected, said scanned position corresponding to said specific scanned position, and deriving the scanned positions for all color data read by said plurality of sensor lines on the basis of the offset size obtained by said offset size deriving means and working out the coordinates to be occupied on the image memory for all color data.

17. The image reading method as defined in claim 15, which comprises:

detecting the scanned positions corresponding to specific color data on a specific color out of said read color data, and working out, on the basis of specific scanned positions detected by said scanned position detection means, the offset size from said specific scanned positions to the scanned positions of the respective color data on the other specific colors with their scanned positions not detected, said scanned positions corresponding to said specific scanned positions and working out picture element coordinates—on the sensor line to read all color data on the other specific colors than said specific color out of a plurality of color data read by said line reading means—from the picture element coordinates of all color data on said specific color.

18. The image reading method as defined in claim 15, which comprises:

detecting the respective scanned positions corresponding to said respective read color data, and separately deriving the respective coordinates on the image memory for color data on said plurality of read color data on the basis of said detected scanned positions.

19. An image reading method, which comprises:

simultaneously reading color data on a plurality of colors by scanning a color document with a set of sensor elements for reading a plurality of color data, said sensor elements lined up in a line at a specific interval, detecting all scanned positions corresponding to all color data on a specific color out of said read color data on a plurality of colors, and deriving different coordinates to be occupied on the image memory for said read color data—for different picture elements corresponding to the respective read color data, and mapping said respective read color data at said coordinates obtained on the image memory.

20. The image reading method as defined in claim 19, which comprises:

working out, on the basis of said detected scanned positions for the color data on a specific color, the offset size between the sensor elements in the sensor direction to find the scanned positions for the color data on the other specific colors with their scanned positions not detected, and working out picture element coordinates to be occupied on the image memory for said all read color data on the basis of the sensor-direction offset size.

21. An image reading method, which comprises:

simultaneously reading color data on a plurality of colors by scanning a color document with a plurality of sensor lines, one for one kind of color, disposed side by side at a specific interval, detecting the scanned positions corresponding to said respective read color data and deriving, on the basis of said detected scanned positions, different coordinates—to be occupied on the image memory for said read color data—for different picture elements corresponding to the respective color data, further working out interpolation color data for the interpolation coordinates between said derived coordinates, and mapping said read respective color data and interpolation color data at said acquired coordinates and interpolation coordinates on the image memory.

22. The image reading method as defined in claim 21, wherein:

said interpolation step interpolates the color data at the intermediate coordinates between picture element coordinates obtained on the same sensor line and/or at the intermediate coordinates between the picture element coordinates corresponding or opposed to each other which have been obtained on the respective sensor lines.

* * * * *